(12) United States Patent
Cheng

(10) Patent No.: US 8,799,668 B2
(45) Date of Patent: Aug. 5, 2014

(54) RUBBING ENCRYPTION ALGORITHM AND SECURITY ATTACK SAFE OTP TOKEN

(75) Inventor: Fred Cheng, Los Altos Hills, CA (US)

(73) Assignee: Fred Cheng, Los Altos Hills, CA (US)

( * ) Notice: Subject to any disclaimer, the term of this patent is extended or adjusted under 35 U.S.C. 154(b) by 450 days.

(21) Appl. No.: 12/948,705

(22) Filed: Nov. 17, 2010

(65) Prior Publication Data
US 2011/0289576 A1   Nov. 24, 2011

Related U.S. Application Data

(60) Provisional application No. 61/281,840, filed on Nov. 23, 2009, provisional application No. 61/337,023, filed on Jan. 29, 2010.

(51) Int. Cl.
*G06F 21/00*       (2013.01)
*G06F 7/04*        (2006.01)
*G06F 17/30*       (2006.01)
*G06F 15/16*       (2006.01)
*H04L 29/06*       (2006.01)
*H04L 9/32*        (2006.01)
*G06F 21/34*       (2013.01)
*H04L 9/06*        (2006.01)

(52) U.S. Cl.
CPC .............. *H04L 9/3234* (2013.01); *G06F 21/34* (2013.01); *H04L 9/3228* (2013.01); *H04L 9/0656* (2013.01)
USPC .................................. 713/184; 726/2; 726/9

(58) Field of Classification Search
CPC ..................... H04L 2463/082; H04L 63/0838; H04L 9/3228; H04L 9/3234; G06F 21/30; G06F 2221/2103; G06F 21/34
USPC .......................................... 713/184; 726/2, 9
See application file for complete search history.

(56) References Cited

U.S. PATENT DOCUMENTS

| 5,246,375 A * | 9/1993 | Goede .......................... 434/236 |
| 6,802,000 B1 * | 10/2004 | Greene et al. ................. 713/168 |
| 7,659,869 B1 * | 2/2010 | Bauchot et al. ................. 345/32 |
| 2006/0031174 A1 * | 2/2006 | Steinmetz ....................... 705/67 |

OTHER PUBLICATIONS

Douglas R. Stinson, "Cryptography Theory and Practice", CRC Press, 2002, second edition, p. 44-67.*

* cited by examiner

*Primary Examiner* — Andrew Nalven
*Assistant Examiner* — Quy Pham
(74) *Attorney, Agent, or Firm* — James Cai; Schein & Cai LLP

(57) ABSTRACT

The present disclosure proposes a secure way to generate the OTP code by way of a web browser. A user does not need any electronic device on hand to obtain OTP for 2FA login. A new Rubbing Encryption Algorithm (REAL) is proposed as the base technology. Implementation method of such web-based OTP token is presented and analyzed. It operates through a web-browser with a multiple REAL keys. It can be integrated into many secure Internet commerce applications as well. A system is provided for secure access to a software program or website. The system has a first entity with a computing device with a processor and a memory. The first entity provides a plurality of data items. The system also has a second entity with at least one display for displaying the plurality of data items. The data items are arranged in a predetermined format. The display also displays a prompt for a user identification and a prompt for a code. The second entity has a member with a transparent portion. The transparent portion comprises a periphery with a plurality of markings placed around the periphery. The markings point to a first direction or to an opposite second direction. The second entity overlays the member over the data items. The markings point to the plurality of data items to reveal a code. The code is input and permits access of the second entity to the computing device of the first entity.

22 Claims, 13 Drawing Sheets

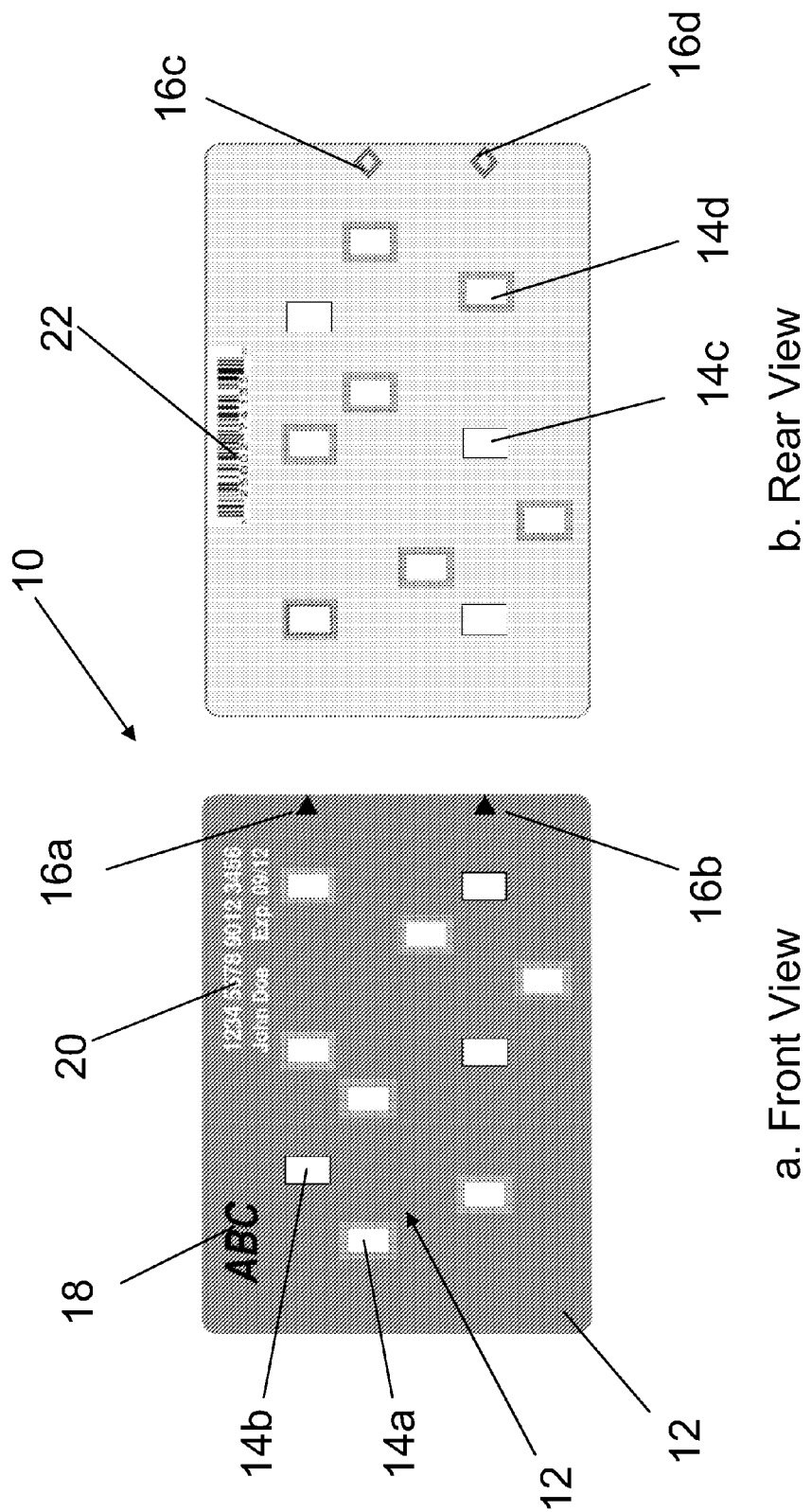

$$\text{Real Image} = \begin{Bmatrix} a_{11} & a_{12} & W_7 & a_{14} & a_{15} & a_{16} & a_{17} & \cdots & a_{1n} \\ a_{21} & W_8 & a_{23} & a_{24} & a_{25} & a_{26} & a_{27} & \cdots & W_0 \\ a_{31} & a_{32} & a_{33} & W_6 & a_{35} & a_{36} & W_2 & \cdots & a_{3n} \\ & & & & \vdots & & & & \\ W_9 & a_{m2} & a_{31} & a_{32} & a_{33} & W_3 & a_{35} & \cdots & a_{mn} \end{Bmatrix}$$
↖ 24

Fig. 2 REAL Image

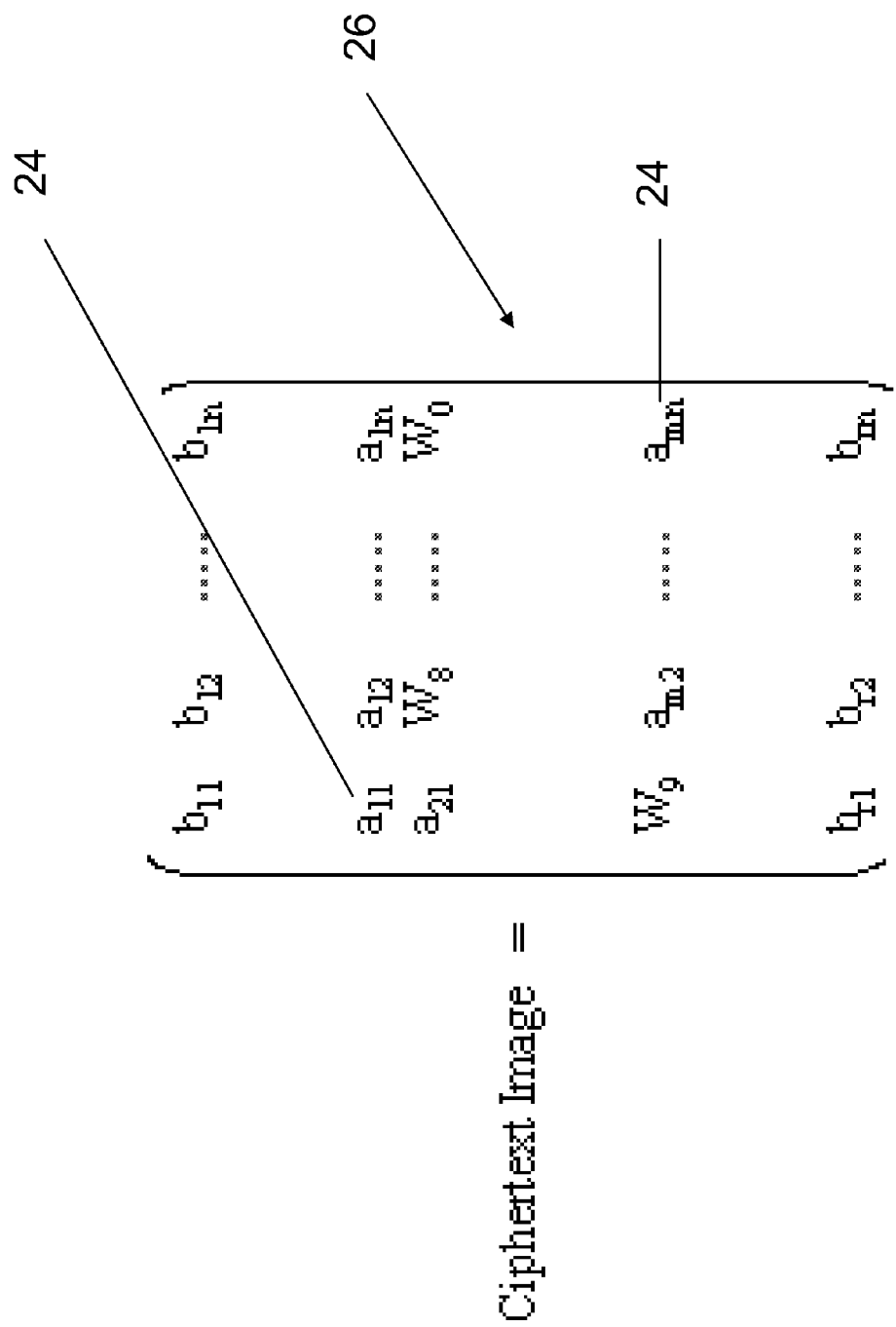
Fig. 3 Ciphertext Image

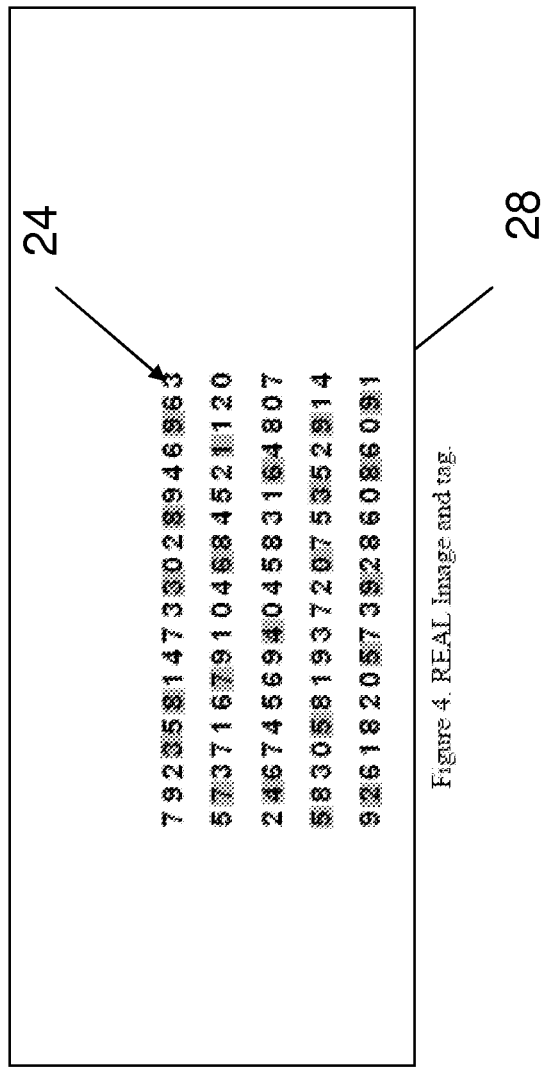
Figure 4. REAL image and tag.

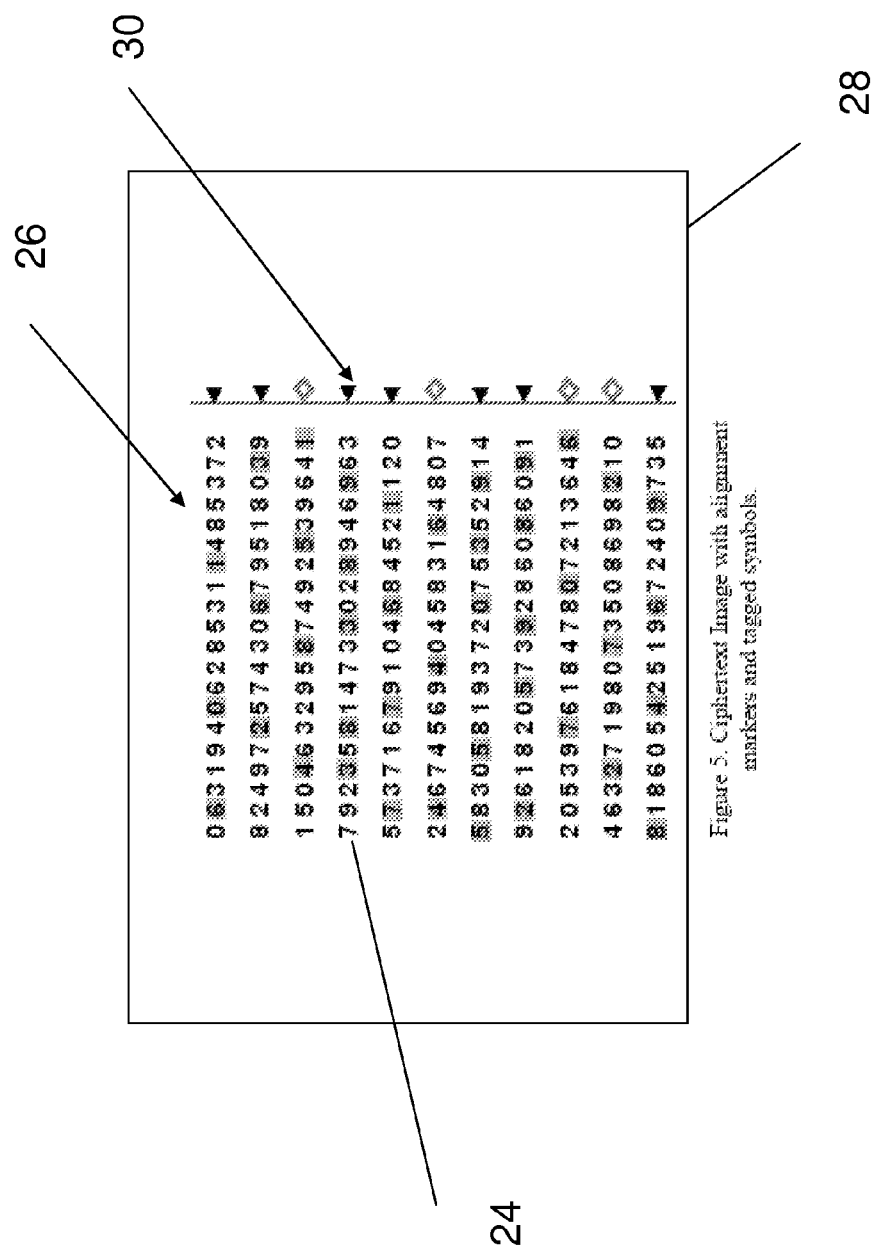
Figure 5. Ciphertext Image with alignment markers and tagged symbols.

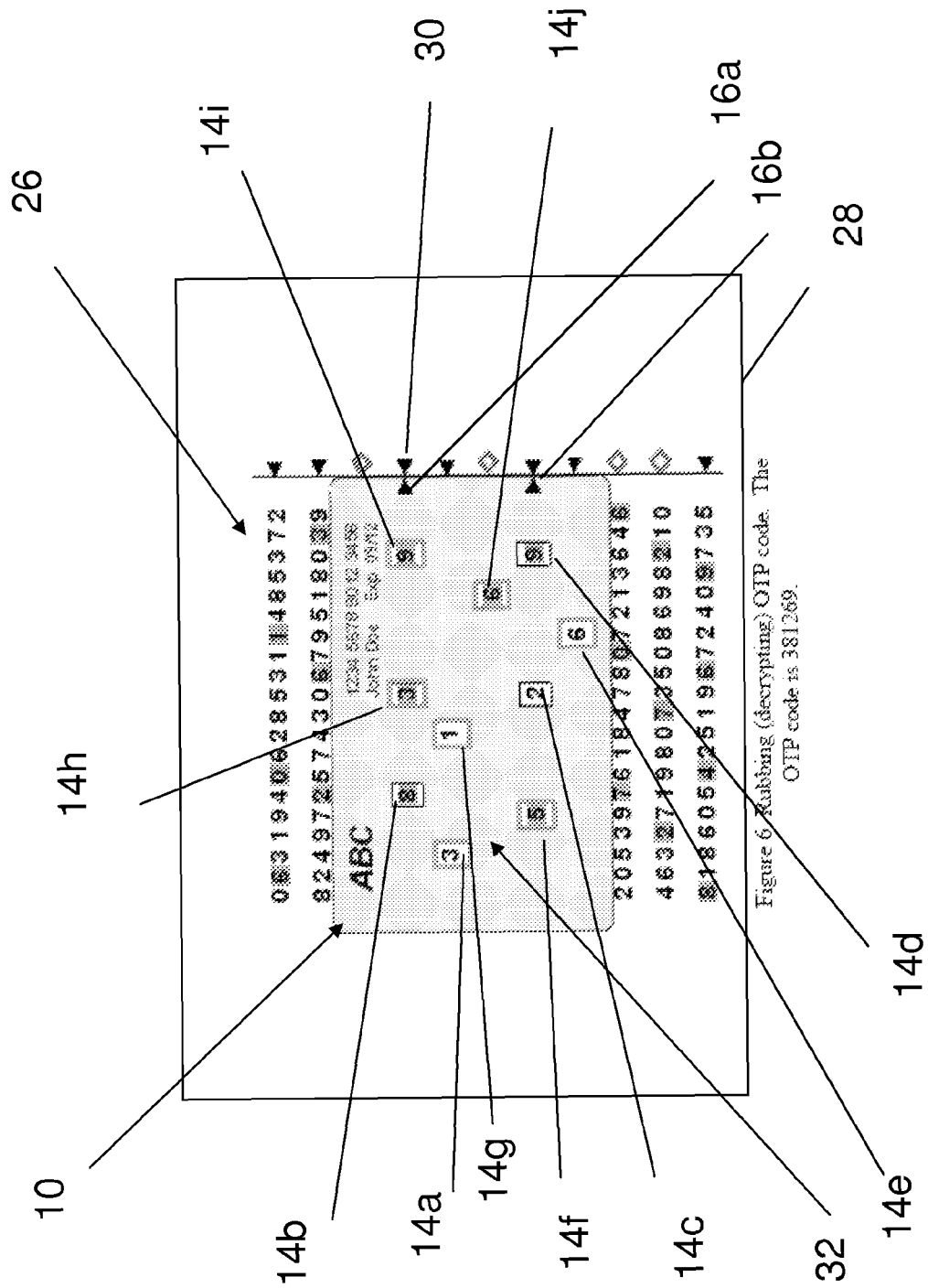

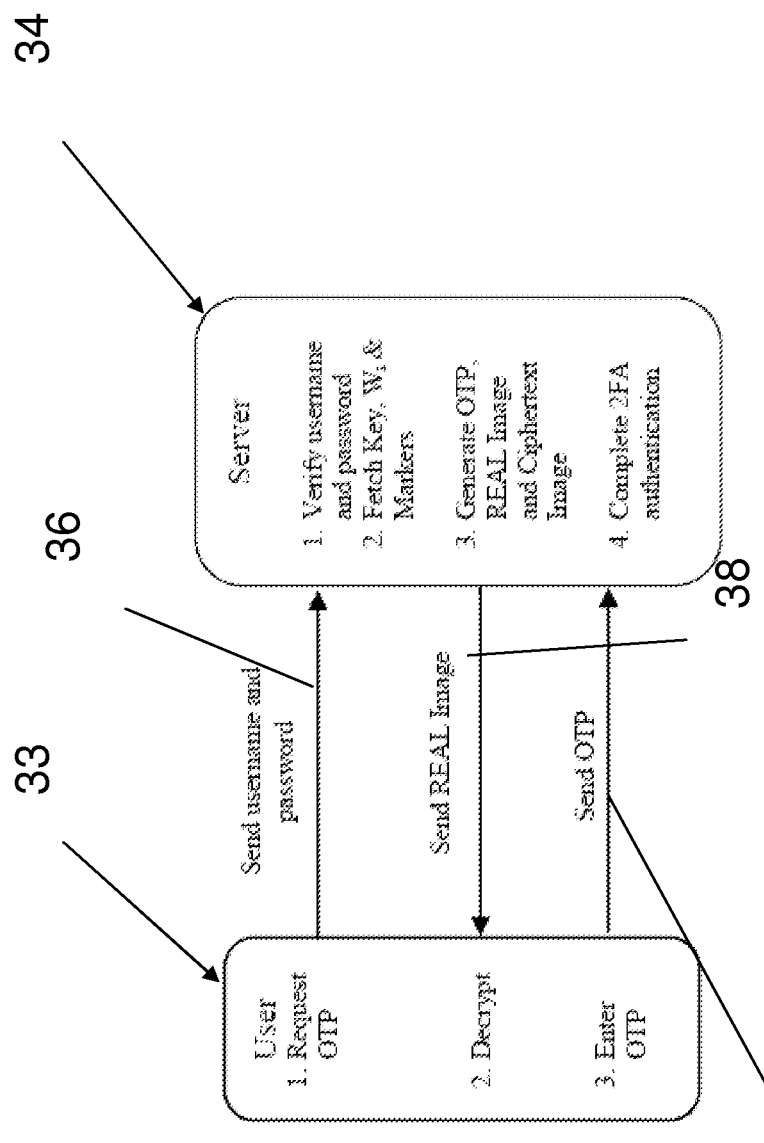

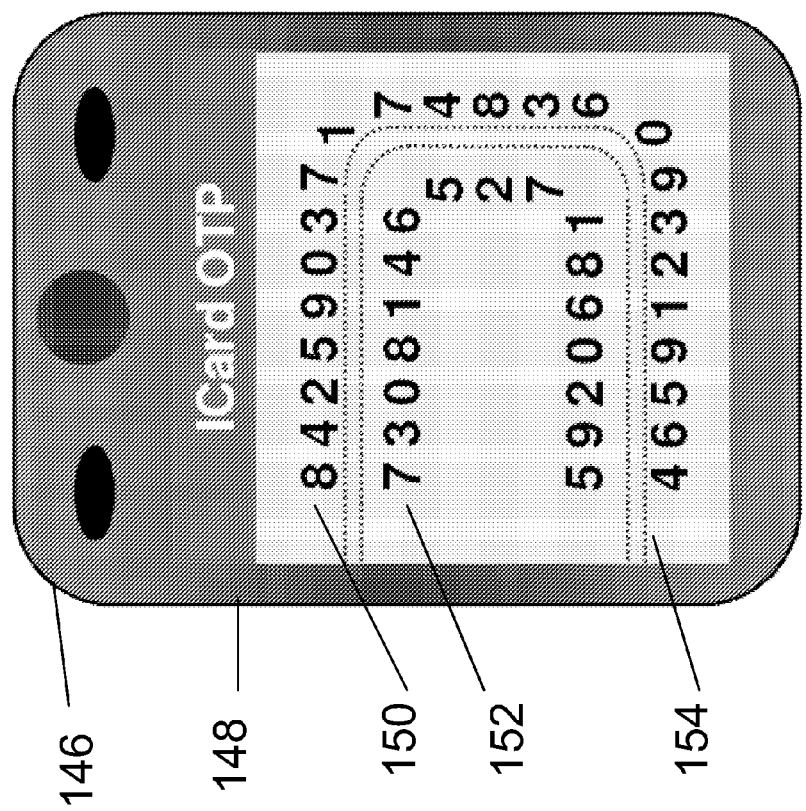
Fig.10A REAL Image

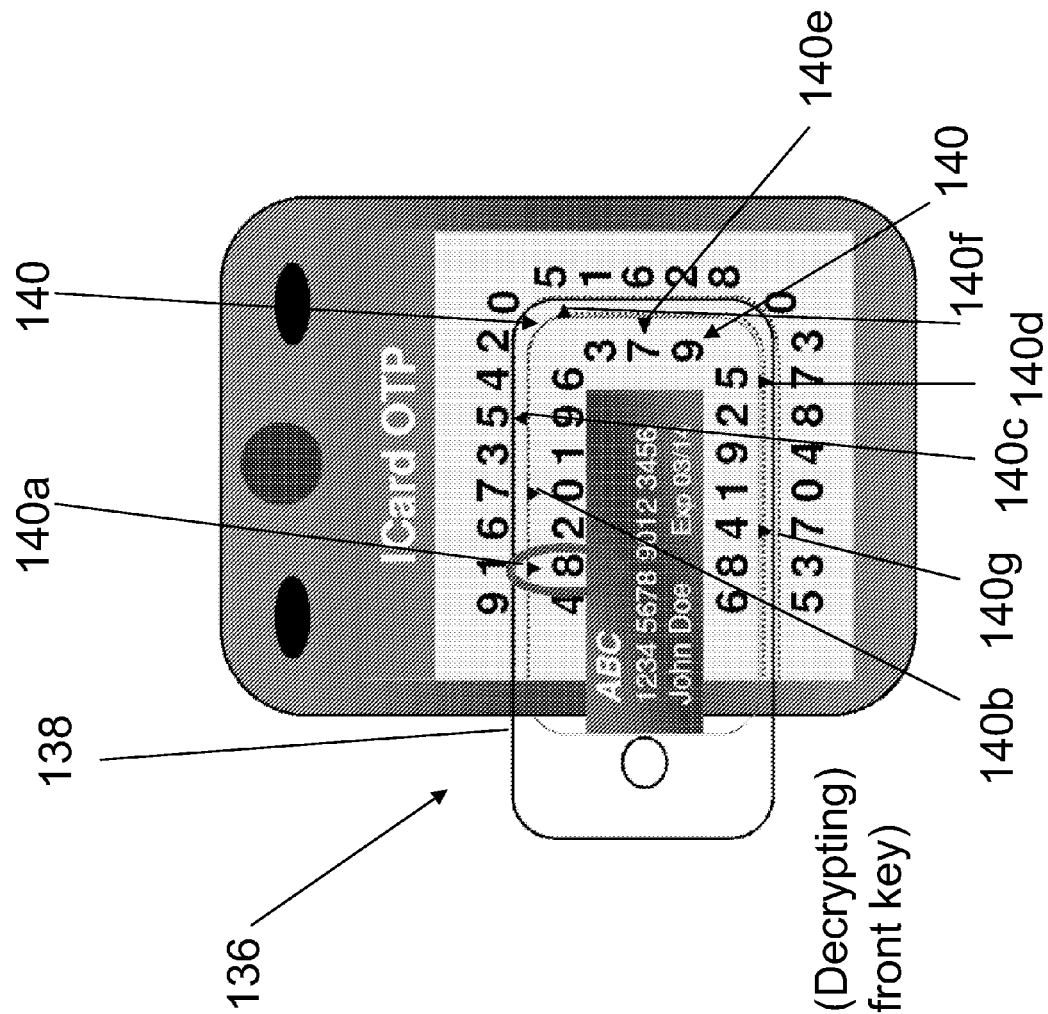
Fig.10B Rubbing (Decrypting)
OTP Code (using front key)

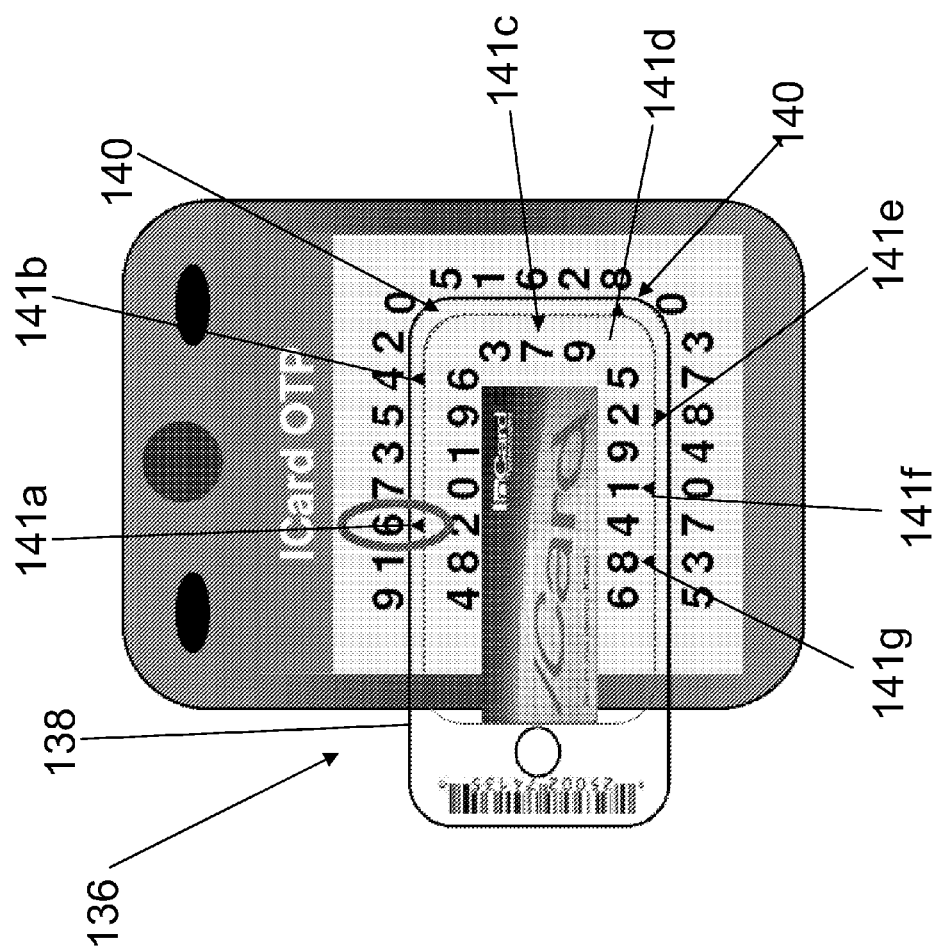
Fig.10C Rubbing OTP Code
(using back side key)

RUBBING ENCRYPTION ALGORITHM AND SECURITY ATTACK SAFE OTP TOKEN

CROSS REFERENCE TO RELATED PATENT APPLICATIONS

The instant patent application herein converts and claims priority to U.S. Provisional Patent Application No. 61/281,840 filed on Nov. 23, 2009 to Cheng, which is herein incorporated by reference in its entirety. The instant patent application herein converts and claims priority to U.S. Provisional Patent Application No. 61/337,023 filed on Jan. 29, 2010 now abandoned to Cheng, which is herein incorporated by reference in its entirety.

FIELD OF THE INVENTION

Embodiments of the present invention generally relate to a method and apparatus for encryption. More specifically, the present invention is directed to a method and apparatus for providing a token for secured access.

BACKGROUND OF THE RELATED ART

There has been an explosion lately in the number and manner of software and business applications over the web. Generally, many different passwords and software tokens are known in order to identify users and permit access to the software applications. However, generally, these solutions are costly and involve complicated and expensive hardware to function. In one prior art solution, a key that updated continuously over the day with new passwords is used. However, this requires a bulky and expensive solution. Furthermore, if data is captured it is possible for a user to reverse engineer the data to obtain a code illegally. Accordingly, there exists a need for a method and apparatus to conveniently, quickly, and accurately detect the propriety of a login in a manner that is cost effective and that prevents the unauthorized access of third parties.

SUMMARY OF THE INVENTION

According to a first aspect of the present disclosure, there is provided a method of providing a secure access to a system. The method comprises providing a plurality of data items displayed on a display. The method comprises providing a member having a plurality of access points disposed on the member and overlaying the member over the plurality of data items. The member covers some data items and the access points do not cover other data items. The access points that are uncovered reveal a code. The code is input to permit access to the system.

In yet another aspect of the present disclosure there is provided a system. The system has a first entity with a computing device with a processor and a memory. The first entity provides a plurality of data items. The system also has a second entity has at least one display for displaying the plurality of data items arranged in a predetermined format. The system further has that the display also displays a prompt for a user identification and a prompt for a code. The system also has the second entity having a member. The member has a plurality of access points disposed on the member. The second entity overlays the member over the data items. The data items are provided by the first entity or provided by a different entity. The member covers some data items and the access points do not cover other data items. The access points that are uncovered reveal the code. The code is input by the second entity to permit access to the computing device of the first entity In another embodiment of the present disclosure, there is provided an access token comprising a support comprising a covered portion and a second visible section revealing a plurality of access points. The access token also has an indicator to assist with orienting the support relative to a matrix of data items. The support covers certain data items and provides a visible code via the second visible section when the support is oriented correctly.

In a further embodiment there is provided a method. The method comprises providing a multidimensional matrix having a plurality of data points. The method also provides a code of at least two data points within the matrix within at least two dimensions of the matrix and the method reveals the code using a token.

According to an aspect of the present disclosure, there is provided a method. The method provides a secure access to a system. The method comprises providing a plurality of data items displayed on a display and providing a member having a transparent portion. The transparent portion comprises a periphery. A plurality of markings are placed around the periphery. The markings point to a first direction or point to an opposite second direction. The method includes overlaying the member over the plurality of data items. The markings point to the plurality of data items to reveal a code. The code is input to permit access to the system.

In yet another aspect of the present disclosure there is provided a system. The system has a first entity with a computing device with a processor and a memory. The first entity provides a plurality of data items. The system also has a second entity with at least one display for displaying the plurality of data items. The data items are arranged in a predetermined format. The display also displays a prompt for a user identification and a prompt for a code. The second entity has a member with a transparent portion. The transparent portion comprises a periphery with a plurality of markings placed around the periphery. The markings point to a first direction or to an opposite second direction. The second entity overlays or places the member over the data items. The markings point to the plurality of data items to reveal a code. The code is input and permits access of the second entity to the computing device of the first entity.

In another embodiment of the present disclosure, there is provided an access token. The access token has a member with a transparent portion. The transparent portion comprises a periphery with a plurality of markings placed around the periphery. The markings point to a first direction or point to an opposite second direction. The markings point to reveal a code on a computer display. The code is input to permit access to a computer system.

In a further embodiment there is provided a method. The method comprises providing a plurality of data points and providing a code of at least two data points within the data items. The data items are placed within at least two columns of data items that are separated by a partition. The code is displayed on a display. The code is revealed using a token.

BRIEF DESCRIPTION OF THE FIGURES

The foregoing and other objects, features and advantages of the invention will be apparent from the following more particular description of preferred embodiments of the invention, as illustrated in the accompanying drawings in which like reference characters refer to the same parts throughout different views. The drawings are not meant to limit the invention to particular mechanisms for carrying out the invention in practice, but rather, the drawings are illustrative of certain ways of performing the invention. Others will be readily apparent to those skilled in the art.

FIG. 1 shows a front view and a rear view of an access token according to the present disclosure;

FIG. 2 shows a matrix of data items generated according to the REAL method of the present disclosure;

FIG. 3 shows a matrix of a number of data items of FIG. 2 generated along with other data items forming a matrix of data items according to the Cipher text image method of the present disclosure;

FIG. 4 shows a REAL image tag;

FIG. 5 shows a Cipher text image tag having the REAL image tag therein and indicators according to the present disclosure;

FIG. 6 shows the token overlaying the matrix of data items of FIG. 5 showing the code therein;

FIG. 7 shows a number of method steps illustrating the present disclosure;

FIG. 10A shows a mobile communication device having a display and on the display are two columns of data items with a partition separating the two columns and the code being hidden within the data items; and FIG. 10B-10C shows the tokens being overlaid over the mobile device with markings pointing to the code to provide an authentication code according to the present disclosure.

DETAILED DESCRIPTION OF THE PREFERRED EMBODIMENTS

Figure 8:
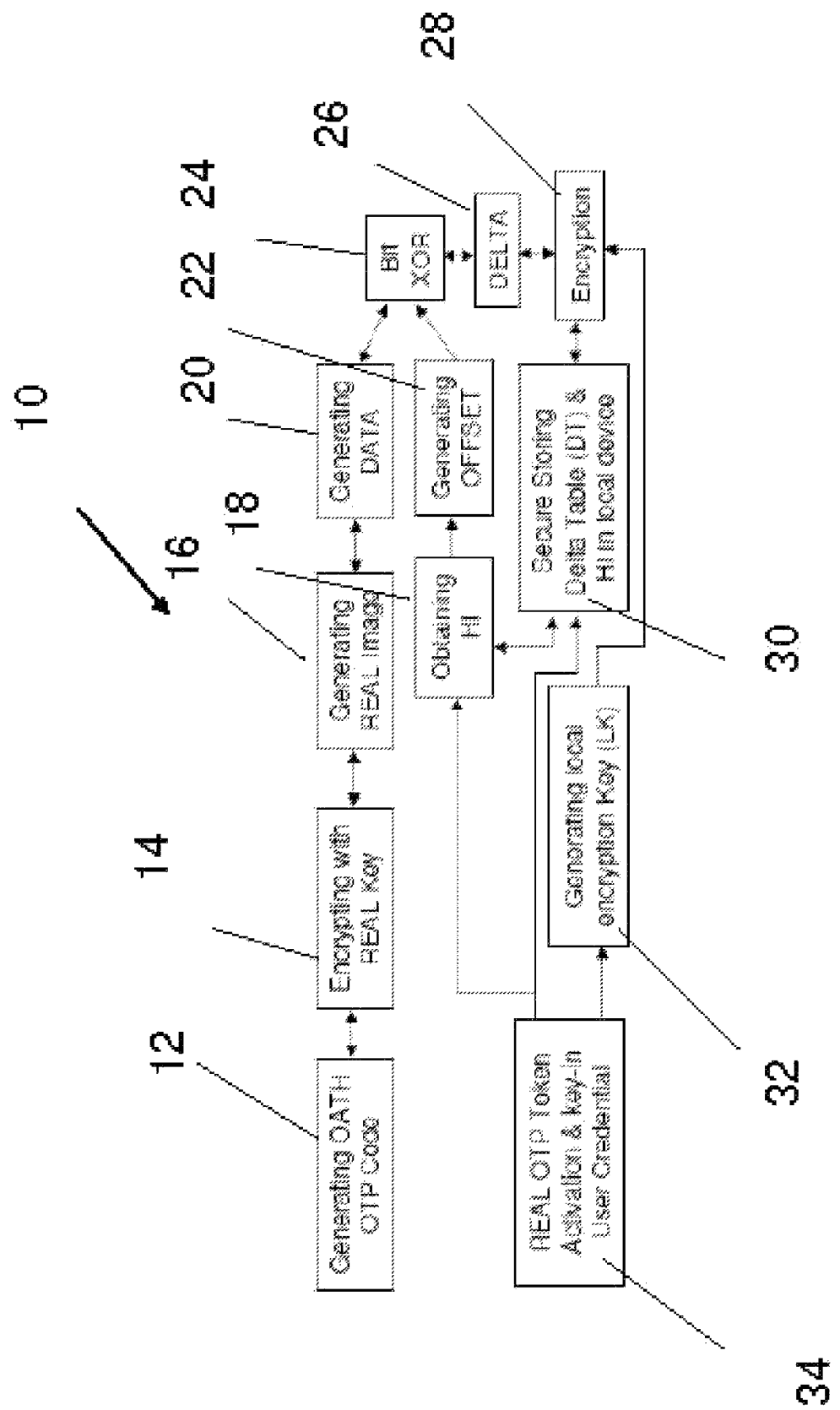
FIG. 8 shows a number of components for providing an authentication using the access token according to the present disclosure.

The Internet has become a popular business transaction platform nowadays. Unfortunately, this powerful and pervasive web somehow is overshadowed by the security threats emerging from the growing malicious Internet attacks. The Two-factor Authentication (2FA) technology, combining a One-time Password (OTP) and simple protocol, has emerged as a popular protection system. The 2FA system employs two user specific factors for authentication. It has better strength to withstand many malicious attacks and can significantly enhance the network security. The US government evaluated and endorsed this technology. It even strongly recommended the financial industry to conform to such authentication system by end of 2006.

OTP is a key technology for the 2FA system. Many solutions were proposed to implement such OTP function into various form factors (token). The solutions offered a standalone OTP token either in pure hardware or software form. Since the OTP is used for remote authentication through web, it is a natural practice to have a web-based OTP token. A few recent proposals started to focus on the web-based OTP solution.

These new solutions still do not gain the expected wide market acceptance. It is mainly due to some deficiencies such as not a true web-based OTP token, poor interoperability and weak or no compliance with existing authentication infrastructures plus poor usability for general public.

A novel Rubbing Encryption Algorithm (REAL) as the baseline technology for a new secured Web-based OTP Token is provided. REAL can securely encrypt a short word length data such as an OTP code. REAL can decrypt the ciphertext without entering encryption key to a PC or device. Such special feature prevents the revealing of an encryption key. It also allows REAL to use a highly complex and dynamic key to achieve a much higher strength of encryption level.

A key bearing hardware token, without having any electronic component, is used to electronically "rub out" (decrypt) plaintext from the ciphertext displayed on a PC screen. This is why the algorithm gets its name—"Rubbing Encryption Algorithm" (REAL) as provided herein. But the most important feature of REAL is its capability to securely protect the plaintext even when the ciphertext is transmitted and shown on an insecure public PC or Internet Kiosk.

Turning now to FIG. 1, there is shown a front and a rear view of a token 10 embedded on a card 10 or the like. The token 10 comprises a covered portion 12 and a number of access points 14a, 14b, 14c, 14d etc. The access points 14a, 14b, 14c, 14d may be apertures or may be transparent windows or any other suitable structure to permit the opposite side to be visible through the token 10. Covered portion 12 preferably blocks data from view.

In another less preferable embodiment, the access points 14a, 14b, 14c, 14d etc may be one or more digital readout items displayed on the token 10. Various configurations are possible and within the scope of the present disclosure. Preferably, the token 10 is placed over and overlaid on a matrix of data. Preferably, the access points 14a, 14b, 14c, 14d reveal an access code. Preferably, the token 10 comprises a first and a second indicator 16a, 16b, 16c and 16d. Indicators 16a-16d preferably are on the rear and on the front of the token 10 on the lateral side thereof.

Preferably, the indicators 16a-16d align with second indicators 30 (FIG. 6) associated with the matrix in order to correctly align the token 10 with the matrix of data. The indicators 16a-16d are shown as characters, however, these form no limitations to the present disclosure. The card 10 also includes various authenticating data such as company name 18, bar code 22 and other user related information 20.

FIGS. 2 and 3 show the matrices that the token 10 is aligned with. Preferably, FIG. 2 shows a REAL image 24 displayed on the display. FIG. 3 shows a ciphertext image 26 that contains with REAL image 24 matrix and also includes other data points as discussed herein.

FIG. 4 shows a REAL image tag 24 as displayed on a display 28. FIG. 5 shows the ciphertext image 26 having the REAL image 24 contained therein and on the display 28. Preferably, the ciphertext image 26 comprises a matrix of numbers. Alternatively, the image 26 may be letters, symbols, numbers, arrows, pictures, indicators, data or any combination thereof. Preferably, the matrix 26 includes a number of second indicators 30 displayed associated with the plurality of data items of the matrix 26.

FIG. 6 shows the access token 10 with the access points 14a-14j and covered portions 12. As can be seen certain data or a code 32 is revealed from the matrix from the access point 14a-14j when the first indicators 16a and 16b align with the second indicators 30. Preferably, this code 32 is used in connection with a login or the like to permit one user access to the secured entity. The figures will now be described in detail.

An OATH (Initiative for Open AuTHentication) compliant REAL Web-based OTP Token 10 is presented as an implementation example. The present disclosure first lays out the screen image for the ciphertext 26 based on the web page window size and readability of the text. The designed image of this ciphertext 26 is called REAL Image as the ciphertext symbol is of graphic form instead of a simple text. It deters the easy detection of the ciphertext 26 by a malicious program. REAL encryption key 10 is embedded on an inexpensive and non-electronic plastic card. This card 10 is the REAL hardware token 10. REAL Web-based OTP Token software consists of two major components—Program File and Data File. Both files are stored at server 34 in FIG. 7.

Data File contains database of each user's credential and OTP generation key (K). Operating a REAL Web-based OTP Token is as follows. The user 33 (FIG. 7) initiates an authentication process through a remote PC. When the server 34 receives a request, the OTP Generation Program (OGP) retrieves the user's key to generate an OTP code. OGP then encrypts the OTP code into a REAL Image (ciphertext) generally shown as 26. This REAL Image is sent to the remote PC. The user then uses her hardware token 10 to "rub out" (decrypt) the OTP code from the REAL Image 26.

Such OTP code 32 is then entered into the login window to complete the 2FA process as shown in FIG. 7. The present disclosure uses OATH Time-based OTP algorithm (TOTP) to generate the OTP code 32. As the code 32 is generates by server, it eliminates the counter de-synchronization problem between a standalone OTP token and the authentication server. Since the server generates OTP and the code 32 is accessed through standard web browser, the remote PC does not need to install any OTP software. The decrypted OTP code is always fully compliant to server 34 as it is generated by server 34 itself. This REAL Web-based OTP Token 10 is fully inter-operable with any other OATH TOTP compatible token as long as they all use the same key (K) and time step (T). Further security analysis shows that a REAL Web-based OTP Token 10 exceeds the security level of a regular hardware or software-based OTP token. Overall, such a token 10 presents itself as an inexpensive and secured alternative to effectively protect the network security.

Traditional prior art OTP token (which is completely different from the form factor of this drawing 10), either hardware token or software token, generates OTP code automatically. A user reads the code and enters it into a login window for 2FA purpose. It does not use web to directly generate the OTP code 32. The user will need a token for each 2FA operation. The token works with only one specific authentication server. For different 2FA servers 34, the user will have to carry many different tokens. It is very inconvenient to the user. It also incurs extra token costs.

Using server to generate OTP code has many advantages as described in the first section. Many solutions were proposed using such approach. To safe guard the network security, the OTP code can be sent to a user's cellular phone using the cellular network's Short Message Service (SMS). This approach saves extra hardware token cost though it does need a cellular phone. However such application is limited by the cellular network service coverage. The SMS system also can not guarantee to have in-time or real-time delivery of the OTP code.

SMS approach to send OTP code can prevent the Man-in-the-Middle attack in the Internet. But it can still be of problem when operating in an insecure public PC or Internet Kiosk environment due to confidential cookie can be exposed. A security proxy can be added in between the remote PC and the destined server. The proxy serves as a temporary cookies holder on the user's behalf. So the cookie with confidential data will not be exposed even in a public insecure environment. But since it utilizes the same SMS to send OTP code, it is subjected to the cellular service limitation that indicated in the preceding paragraph.

In more recent work, some proposals use the web to send an intermediate code to direct a user on finding the final password from a pre-printed code table for authentication. The pre-printed code table is sent to the user through another channel such as regular mail, e-mail or hand delivery. So the OTP code is not sent or generated though the web in a real time basis or in a substantially real time basis. A pre-printed code table is needed when using such application. For different 2FA servers, the user will need to carry different pre-printed code tables. This approach does save the hardware token cost. But the user needs to carry multiple code tables for different 2FA systems. Moreover, the network security will be compromised if the code table is lost, stolen or secretly copied.

Rubbing Encryption Algorithm (Real)

Principle

Given an M×N matrix X made up from Y different symbols, the present disclosure can use Shannon entropy H(X) to describe matrix X's uncertainty. See Stinson, D. *Cryptography—Theory and Practice*. CRC Press, Inc.: Boca Raton, 1995, pp. 44-67, which is herein incorporated by reference in its entirety.

$$H(X) = -\sum_{i=1}^{MN} P_i(\text{Log}_2 P_i), \quad (1)$$

where Pi stands for the probability of a symbol being displayed in the matrix X.

If every symbol has an equal chance of occurrence and equal numbers of symbol are displayed in the matrix (equally probable), Pi=1/Y=P and H(X) reaches its maximum Value. Such matrix is called Equiprobable Matrix. The above equation can then be further reduced to $$H(X)=T((\text{Log}_2 Y)/Y), \quad (2)$$

where T=MN and is the size of matrix X. The present disclosure can calculate a symbol's (S) Shannon uncertainty in a matrix X that is made up from Y variety symbols. If each symbol is of equally probable chance to be displayed in the matrix X with size T, its uncertainty H(S) can be represented as follows.

$$H(S)=\text{Log}_2 Y \quad (3)$$

From (2) and (3), the present disclosure can conclude the following points. In a fixed size matrix made up of equally probable chance of symbols, both the matrix and symbol's uncertainty decreases when variety of different symbols increases. When increasing the variety, symbol's uncertainty decreases even faster than matrix. On the other hand, the matrix's uncertainty increases when the size of matrix increases. Optimization between matrix size (T) and variety of symbols (Y) can be done by closely following (2), (3) and symbol's equally probable rule to achieve a desired high uncertainty on both matrix X and the symbol S.

During the encryption process, REAL places the original plaintext (denoted as symbol F) as part of the elements of the matrix X. Such REAL encrypted matrix X is also called REAL Image 24 (FIGS. 2 and 4). The encryption criterion is to have REAL Image be an Equiprobable Matrix and F' uncertainty value always stays higher than those symbols that are not used in the plaintext. The higher Shannon uncertainty value a REAL Image and symbol have, the securer such REAL encrypted plaintext (F) will be.

Ultimately, the encrypted symbols will have as high uncertainty as possible in a REAL Image 24. It helps to ensure a good security level on the REAL encrypted data (plaintext symbol F). Obviously, REAL 24 does not alter or replace the plaintext's symbol when composing a REAL Image 24. This feature lends REAL to be a useful tool to preserve the integrity of an original data when encrypting a short word length plaintext. The present disclosure can further extend this two dimensional matrix into a spatial format with multiple dimensions. It should be appreciated that the matrix 24 can be any size that can be displayed on the display 28 or displayed on multiple screens. As long as each REAL Image and symbol are equally probable plus each symbol has the same number of occurrence in each dimension, then this particular spatial system has reached its peak value of uncertainty. As REAL allows a multi-dimensional encryption scheme, its corresponding key and token can be of the same multi-dimensional form factor. Such multiple dimensional REAL encryption opens up a new way for many different secured encryption schemes.

Encryption Procedures

REAL allows the encrypted data (REAL Image 24) to be displayed in many different spatial form factors. It can be in the form of a data stream (one dimension) or a two dimensional matrix or can be of other spatial form with multiple dimensions. The corresponding encryption key will be of the same multiple dimensions as well. For ease of discussion, an M×N matrix X (REAL Image 24) and numerals of 0 to 9 plus a tag (denoted as character G) as the set of symbol are chosen to illustrate the proposed algorithm. The tag is a colored background bar placed over a symbol. FIG. 4 shows the pink color tag as an example. 1)

1) Key Generation: With the display window and symbol font sizes chosen, a REAL Image 24 is designed and layout first. REAL encryption key is the specific spatial locations (Wi) where the plaintext's symbols are placed. Given a REAL Image 24 with size of M×N, the present disclosure can use a credit card size plastic card 10 as REAL hardware token 10. FIG. 1 shows one such example. Transparent windows 14a-14c or apertures are randomly placed on the card surface 10. For D symbols of plaintext, the present disclosure use "D+E" number of windows as key. The total number of key 10 (TNC) that can be embedded on such hardware token 10 with D+E random windows can be found from the following equation.

TABLE I

Generation of a Secured Spatial Matrix

| | $W_9$ | $W_8$ | $W_7$ | $W_6$ | $W_5$ | $W_4$ | $W_3$ | $W_2$ | $W_1$ | $W_0$ |
|---|---|---|---|---|---|---|---|---|---|---|
| I | $D_5$ | | $D_4$ | $D_3$ | | $D_2$ | $D_1$ | | | $D_0$ |
| II | 3 | | 8 | 1 | | 2 | 6 | | | 9 |
| III | 3 | G | 8 | 1 | G | 2 | 6 | G | G | 9 |

Real Image =

$$\begin{pmatrix} a_{11} & a_{12} & W_7 & a_{14} & a_{15} & a_{16} & a_{17} & \cdots & a_{ln} \\ a_{21} & W_8 & a_{23} & a_{24} & a_{25} & a_{26} & a_{27} & \cdots & W_0 \\ a_{31} & a_{32} & a_{33} & W_6 & a_{35} & a_{36} & W_2 & \cdots & a_{3n} \\ & & & & \cdots & & & & \\ W_9 & a_{m2} & a_{31} & a_{32} & a_{33} & W_3 & a_{35} & \cdots & a_{mn} \end{pmatrix}$$

FIG. 2. REAL Image

Ciphertext Image =

$$\begin{pmatrix} b_{11} & b_{12} & \cdots & b_{ln} \\ a_{11} & a_{12} & \cdots & a_{ln} \\ a_{21} & W_8 & \cdots & W_0 \\ W_9 & a_{m2} & \cdots & a_{mn} \\ b_{r1} & b_{r2} & \cdots & b_{rn} \end{pmatrix}$$

FIG. 3. Ciphertext Image $$TNC = C(T, (D+E)), \quad (4)$$

where $T = M \times N$. TNC is also the total number of different token for this specific REAL Image. Only one out of the TNC cards 10 has the correct key (window locations 14a-14d shown in FIG. 1) to decrypt the encrypted REAL Image 24. The probability ($P_1$) to find the correct key is 1/TNC. E's value can then be determined by the desired security level from equation 4. Thick pink color and thin black color lines are used for the window boundary 14a-14d on the token 10. When a symbol with a pink tagged background is shown through the thick pink color boundary window, this symbol will be ignored when rubbing the plaintext. However, this is only one embodiment of the present disclosure, and in another embodiment, all of the windows 14a-14d may be used.

2) Generating REAL Image 24 and Ciphertext Image 26: REAL places the plaintext into the corresponding Wi locations in matrix X according to each symbol's occurring sequence. The present disclosure uses the following example to illustrate REAL Image's generating procedure.

Assuming D=6, E=4, plaintext code=381269, the present disclosure then has D5=3, D4=8, D3=1, D2=2, D1=6 and D0=9 for the plaintext code. Row I and II of Table I show how plaintext OTP code 32 can be randomly assigned to each window location 14a-14j shown in FIG. 6. Row III shows how tags are filled into the locations that do not have the numeric symbols.

In a REAL Image 24 with size T, each Wi has its own specific element $a_{ij}$ in the matrix X. These elements are then filled with the corresponding symbols shown in row III of Table I. The rest of "T−(D+E)" locations including the 4 tagged locations in row III of Table I are filled with randomly chosen symbols so that the symbols shown in the OTP code 32 will have higher complexity than rest of the symbols. The present disclosure then completes the REAL Image 24. The M×N matrix in FIG. 2 shows such an example.

Next the present disclosure constructs another larger size of ciphertext matrix 26 shown in FIG. 5 (R×N) that embeds the REAL Image, where R is larger than M. Such R×N matrix is also called Ciphertext Image 26. The present disclosure randomly places the REAL Image 24 inside this Ciphertext Image 26 as shown in FIG. 5-6. The present disclosure then randomly fills the symbols including the tag into the elements of Ciphertext Image 26 so that each symbol including tag will have equal occurrence frequency. The tag symbols were carefully placed in Ciphertext Image 26 so that only the REAL Image 24 will show 6-digit OTP code 32. The present disclosure then has completed the encryption of the plaintext into a secured Ciphertext Image 26. FIGS. 3 and 5 show such example. The REAL Image 24 and Ciphertext Image 26 generation pseudo code are shown in CIPHERTEXT_IMAGE_GEN below. In this code, K is the OTP generation Key and i is the counter value. The OTP code is generated by the targeted OTP algorithm as shown in step 3.

| | CIPHERTEXT_IMAGE_GEN (K, i, R, N) |
|---|---|
| 1 | UC = User Credential //input by a user when activates OTP generating process. |
| 2 | Using UC. server retrieves the user's OTP secret key (K) and $W_i$ location data on the REAL Image. |
| 3 | OTP = OTP_Generation_Algorithm (K, i). |
| 4 | OTP = Concatenate(D_5 \| D_4 \| D_3 \| D_2 \| D_1 \| D_0). |
| 5 | Sequentially placing D_5 through D_0 into the $W_i$ locations inside the M x N matrix. Fill other $W_i$ with tags. |
| 6 | Fill the rest of matrix elements with randomly chosen symbols and tags. So that the symbols used by OTP |

-continued

| CIPHERTEXT_IMAGE_GEN (K, i, R, N) |
|---|
| code have higher complexity than others. This is REAL Image. |
| 7  Place REAL Image inside the R x N Ciphertext Matrix. Fill the rest of matrix elements with randomly chosen symbols and tags. So that each symbol has the same occurring frequency and only REAL Image will display the OTP code. This is Ciphertext matrix. |
| 8  Ciphertext_Image = Ciphertext matrix. |
| 9  End of program. |

Decryption Procedure

To decrypt and recover the plaintext, the present disclosure overlays the REAL hardware token 10 on the REAL Image 24 and 26. After properly aligning the token 10 on the screen 28, the plaintext (OTP code 32) clearly appears through the transparent windows 14a-14j on the card 10. FIG. 6 shows such an example. The original OTP code 32 is recovered and ready for 2FA application. Notice that the user does not need to enter the REAL decryption key to decrypt the REAL Image 24.

Implementing the Real Web-Based OTP Token

The present disclosure successfully implements an OATH compliant REAL Web based OTP Token 10. This token 10 will have a 6-digit OTP password or code 32 and be available using a PC's web browser. The present disclosure uses OATH time-based OTP algorithm (TOTP) to prevent counter's de-synchronization issue.

It is important to have a secured web-based OTP generation even when operating in an insecure public Internet kiosk environment. Moreover, the token 10 should be inexpensive, easy to carry, full compliant to existing infrastructure—authentication server and token, plus easy to deploy and support through the Internet.

REAL Image and Ciphertext Image Generation

Many factors affect the design of a REAL Image 24. Some may also affect the token 10 security or usability. Some may be in the service provider's interest such as the open space on token surface 10 to show its brand name as shown in FIG. 1, which is one embodiment of the present disclosure. The factors may include one or more parameters:

Token's 10 physical dimension,
Key window 14a-14j (transparent window) size,
Optimal symbol font size for ease of reading (rubbing), and
Security level of the REAL Image 24 and Ciphertext 26 Image Image is layout to allow easy token 10 overlaying when decrypting the Ciphertext Image 26. In our example, the present disclosure has a Ciphertext Image 26 with an 11×20 elements. The REAL Image 24 with a size of 5×20 is embedded in this Ciphertext Image 26. FIG. 4 and FIG. 5 show the details of the two images but it should be appreciated that various configurations and matrices are possible and within the scope of the present disclosure.

A few alignment markers 30 along a vertical line on the right of Ciphertext Image 26 are used for token 10 alignment to accurately rub (decrypt) the ciphertext image 26.

REAL Web-based OTP Hardware Token

Token's 10 physical size may affect the ease of carrying and handling. The present disclosure selects a token 10 with size like a credit card (Length×Width×Thickness=3.375"× 2.125"×0.03") as it is the most common size accepted by consumer. The material of this token 10 conforms to credit card's ISO/IEC FDIS 7810 standard. There are many different ways to embed the REAL encryption key on such token 10. One of the methods as the present disclosure described is to have transparent windows 14a-14j placed on the surface of hardware token 10 as shown in FIG. 1. A user can decrypt (rub) the OTP code 32 from the Ciphertext Image 26 displayed on PC screen 28 as shown in FIG. 6.

The token 10 manufacturing process is very similar to a regular credit card. With same material and similar manufacturing process, the cost of a REAL hardware token 10 is comparable to a credit card. Each hardware token 10 has a serial number that represents the spatial window location data (Wi), window boundary line color and width. The serial number also relates to the type and locations of the alignment markers 16a-16d. These are the information of REAL encryption key. Using different front and rear alignment markers 16a-16d (as shown in FIG. 1) allows each token to embed one, two or more set(s) of (Wi) or two or more encryption keys (K). Choosing the type of marker on the Ciphertext Image 26, the present disclosure also determine which key 10 is used (or to use which side of token) for REAL decryption. Each user is assigned a unique hardware token 10 during the registration process. The serial number, encryption keys, alignment marker type/location and the user's credential information (username, password and/or PIN) are then recorded and stored securely at a database server for future use.

REAL Web-based OTP Software

REAL Web-based OTP Token 10 has two major parts of software. They are Program File and Data File. Both files are securely stored at server 34 shown in FIG. 7. The Program File contains the executable files to generate OTP, REAL Image 24, Ciphertext Image 26 and other tasks. The list of Program File includes the following programs.

OATH TOTP Code Generation program
HMAC-SHA-1 program
Ciphertext Image Generation program
End of session housekeeping program
Help Menu with Demo program and Version Number The above OATH TOTP Code Generation program uses the exact OATH Time-based algorithm (TOTP). The algorithm is as follows.

$$\text{TOTP=TRUNCATE(HMAC-SHA-1}(K,T)), \qquad (5)$$

where K is a user specific 160 bit key, T is a value associated with the time step. HMAC-SHA-1 function generates a 160 bit of hashed data from K and T. The dynamic truncating function then reduces the hashed data length and generates the final 6-digit TOTP code for our token. In another embodiment, the data length can not be reduced.

Data File consists of two components—User Credential File (UC File) and OTP File. UC File stores the user's credential data (UC) and user's accumulated web-OTP access count (q). It is stored in a secure server for the initial user verification. The OTP File is stored in a separate secure server. It stores the encrypted hardware token serial number, OTP code generation keys (K) and token's alignment marker type/location data. To further protect each user's confidential OTP File, a 160 bit encryption key (SK) is generated from the user's credential information (UC) and her accumulated access count (q). Each user's OTP File is encrypted with the corresponding key (SK) before storing into the database server. This will keep the confidential Data File secure even when the UC File server is broken in by malicious attack. Such encryption key can be generated by the following pseudo code.

$$SK\text{=HMAC-SHA-1(HMAC-SHA-1}(UC,\text{AND}(UC,q)), UC), \qquad (6)$$

where UC is the concatenation of user credential information such as userID and Web-based OTP server access password, q is the user's accumulated access count. The access password should be of good security strength to ensure a secure operation.

Secure, Scalable and Reliable Servers

1) Secure and scalable servers: Having secure and reliable server is preferred for a robust REAL Web-based OTP operation. The server should have very high scalability as well. So it can be easily expanded to service a great number of OTP generation requests at the same time. General security practice should be observed to ensure a good quality and reliable operation.

2) Synchronized with reliable time source: The server will synchronize its clock to an accurate Internet time source such as NIST's Internet Time Service NTP servers. It will ensure the desired security and randomness for each generated OTP code.

Set Up Secure and Robust Network Interface

1) Secure network interface: A reliable web-based OTP token operation relies on the secure network set up and its protection mechanism. Robust network protection mechanism is a preferred option. It should effectively resist various malicious attacks—such as denial of service and many other attacks from the Internet.

2) Using HTTPS protocol: REAL Web-based TOTP program can be running as a standalone program in a separate web site 34. Ideally, it can also be integrated into a 2FA system and work as an add-on software module to the authentication server. The Hypertext Transfer Protocol Secure (HTTPS) is engaged when a user logins the web site. See Rescola, E. "HTTP Over TLS," The Internet Society, Network Working Group. RFC2818, May, 2000, which is incorporated by reference in its entirety. This extra protection will further reduce the level of unwanted malicious attacks existing in the Internet.

Operating Real Web-Based OTP Token

To operate REAL Web-based OTP Token, a user 33 links to a designated web site. The user 33 keys in her username and password and sends to OTP server 34 through HTTPS operation to initiate the OTP generation process as shown as reference arrow 36. After successfully verifying the user's credential information (UC), the server 34 retrieves user's accumulated web-OTP access count (q) from UC File and generates the key (SK) using (6). Server 34 then fetches and decrypts the user's OTP File from the SK encrypted database. Program Server 34 generates the Ciphertext Image 26 following the CIPHERTEXT_IMAGE_GEN program as shown by reference arrow 38. Ciphertext Image 26 is sent through HTTPS to display on the user's PC 33 as shown in FIG. 5. The user 33 overlays and properly aligns her hardware token 10 on the screen 28 to decrypt (rub) the correct OTP code 32 from the REAL Image 24 and 26 as shown in FIG. 6.

The OTP code 32 rubbing sequence is as follows as shown in FIG. 6,

Starting from the top of the far left column,

Reading vertically downward till reaching the end of the column,

Moving to the next column and reading through the end of this column, and

Following such sequence until reaching the bottom of the far right column on the token.

Tagged symbols seen through tagged windows can be ignored.

The first six numeral symbols, ignoring the tagged symbols (5, 3, 6 and 9) that shown through the thick pink boundary windows (tagged windows) a, obtained through the above sequence are the OTP code 32. Tagged symbols 8 and 9 are displayed in thin black window boundary. They are legitimate symbols and are part of the OTP code 32. In FIG. 6 example, the OTP code 32 is 381269. The user 33 enters this OTP code 32 into the login window to complete the 2FA process as shown by arrow 40. FIG. 7 summarizes the operation procedures.

Turning now to FIG. 7, there is shown a first entity 33 operable with a first computing device having a processor, a memory, an input device, and a display and a second entity 34 operable with a server or a second computing device having a processor, a memory, an input device and a display and a network connection. Preferably, communication links are provided to exchange data along links 36, 38 and 40. Preferably, data 36 data is communicated that indicates a user name and password from the first entity 33 to the second entity 34. In response, and when confirmed, the second entity 34 sends data 38 that includes the image 26 including the plurality of data points in a matrix format as described above. Using the access key 10, the user 33 places the key 10 on the matrix to obtain the code 32 and the code is sent via data 40 to the entity 34 to authenticate the user 33. Thereafter, the authentication is complete and the user 33 is permitted access.

Design Goals Review and Security Issue Analysis

The present disclosure compares the OATH compliant REAL Web-based OTP Token presented in prior section against our design considerations in this section. The present disclosure analyzes the design achievements and security related issues in the next section.

Inexpensive:

From web survey as of Q2, 2010, a regular hardware token is priced around $5 to $40 or higher. See Entrust. "Entrust IdentityGuard Token Quantity One: $5", Apr. 29, 2010, which is incorporated by reference in its entirety. A software token is priced about $3 to $10 or higher. See SECUREHQ "SecurID SID820 Soft Tokens", Apr. 29, 2010, which is incorporated by reference in its entirety. REAL Web based OTP Token 10 shown in FIG. 1 requires no electronic nor software component. Besides easy to carry, the REAL hardware token 10 is inexpensive with a cost comparable to a popular credit card (less than $0.5).

Full Compliance and Interoperability:

REAL Web-based OTP Token 10 uses the exact same OATH TOTP generation algorithm to generate the OTP code 32. The OTP code 32 is 100% compliant to any OATH authentication server 34. It is also 100% interoperable with any other OATH TOTP token that uses the same key (K) and time step (T). Regular hardware OTP token will only work with the pre-determined OTP algorithm and can not be compliant or interoperable with other OTP system.

Easy Deployment and Low Supporting Cost:

1) Deployment: Simply adding the software module and database servers 34 when integrating the REAL Web-based OTP Token 10 into a 2FA system. The impact on the sever 34 and its maintenance cost is minimal as comparing to other OTP solutions. Since the OTP is generated by server 34, a user does not need to carry any electronic or install any software token. REAL Hardware Token 10 can be easily mailed to a user following the similar logistic of a regular credit card.

Using HTTPS, a user logins into a designated web site (specified by server 34) and submits her token's serial number 22 to activate the token 10. The activation can also be done through a home phone which follows a similar secure procedure that a regular credit card does. These simple and proven secure activation procedures ensure a low deployment cost as well.

2) Supporting: All the program and confidential database are stored in the central servers 34. A user uses the OTP generation program entirely through web browser on PC or Internet devices. Technical support can be done easily through Internet to remote user. It will significantly reduce the supporting cost.

User Experience:

Using REAL Web-based OTP Token 10 is very similar to the operation of a regular software token. It ensures quick adoption by a new user.

Security Analysis

OTP Code Security:

REAL Web-based OTP Token uses the exact OATH TOTP algorithm to generate an OTP code 32. It does not replace or alter the OTP code 32 during the encryption and decryption processes. So REAL OTP code 32 is of the same security level as that generated by regular OATH OTP token.

In other word, REAL Web-based OTP Token 10 does not degrade the OTP code 32 security level. A detailed OATH OTP code security analysis can be found in Appendix A of RFC4226 for further reference. See M'Raihi, D., Bellare, M., Hoornaert, F., Naccache, D. and Ranen, O. HOTP: An HMAC-Based One-time Password Algorithm, The Internet Society, Network Working Group. RFC4226, December 2005, which is herein incorporated by reference in its entirety.

Security of REAL Image and Ciphertext Image: A REAL hardware token 10 can accommodate 5×20 (M×N) symbols which is also the size of REAL Image 24. From (4), the present disclosure knows that 1.7E+13 (=C(100,10)) different 10 transparent window patterns 14a-14j can be created on each side of the hardware token 10. The windows 14a-14j with different boundary color and line width acting with the dynamic tags on the Ciphertext Image 26 provides a dynamic session key controlled by the server 34. Given the hardware token 10 shown in FIG. 1, 6 windows 14a-14j have thick pink boundary. 4 of the 6 symbols shown through these windows 14a-14j will be ignored by the tag setting from server 34.

The present disclosure then has 15 (=C(6, 4)) key patterns per side with each fixed window pattern 13a-14j on the token 10. So for every token 10, there is 30 (=15×2) dynamic session keys available for REAL encryption (when uses windows on both sides). Number of the dynamic session key increases when colored transparent window and tag increase. This dynamic session key increases the desired security level when sending and displaying Ciphertext Image 26 in public Internet or PC 33.

Given a known REAL Image 24 but without the aid of the hardware token 10, to guess a correct window pattern 14a-14j (REAL key and OTP code 32), the possibility (Pa) is 1.9E−15 (=1/((1.7E+13)×30)). In our implementation, the REAL Image 24 is embedded inside Ciphertext Image 26. The possibility (Pb) of finding the correct location of the actual REAL Image 24 from a known Ciphertext Image 26 is ⅐(=1/(11−5+1)). So given a known Ciphertext Image 26, the possibility ($P_1$) of correctly finding the REAL key and OTP code 32 is 2.8E−16 ($P_2$=Pa×Pb). So cracking either image is much tougher than a brute force guess of the 6-digit OTP 32 which has a possibility of 1E−6. All the symbols used are made of pure image form. So it can not be easily read by the malicious program such as a Trojan. It increases the security level on both REAL Image 24 and Ciphertext Image 26.

Security in Adversary Situations

Many adversary cases can result in comprising network and data security. They can be one or more of the following situations.

1) Hardware Token 10 is lost, stolen or secretly photo copied: A regular OTP token is a standalone OTP code generator. Whoever gets the token has the full capability to generate all the future OTP codes. The security is compromised until such token is removed from the active service list in the sever database. On the contrary, when REAL hardware token 10 is lost or stolen and falls into an intruder's hand, it is protected by the REAL Web-based OTP Token's userID and Web-based OTP server access password. It provides extra protection to the token and network security even when the token is lost, stolen or secretly photo copied.

The security level will be as strong as how user chooses the userID and access password. Again, the token issuer should enforce a higher strength password rule, such as using alphanumeric character with greater than 6 to 8 digit in length. The server is set to shut off any unsuccessful login after a limited number (e) of trials of the user credential. The e is the login threshold setting with the trade off between network security and user friendliness. It will be set by each organization to fit its actual application needs. Certain options can be implemented to prevent hardware token being secretly photo copied. One such method is to use a transparent card and print the window's boundary with an ink that can not be sensed by copier or camera but is visible to human eye. This is very similar to the holographic technique that is used in today's credit card to show its authenticity. In other word, adopting optical technologies into REAL Web-based OTP hardware token making process will greatly enhance token's security protection.

2) Using insecure public PC: Internet Kiosk or public PC is conveniently available in brokerage firm, bank, hotel, airport, school or conference, etc. Using such public PC or kiosk is becoming popular. When a user logins by using REAL Web-based OTP Token through such PC; user credential, Ciphertext Image and its decrypted OTP code may be captured. But to replay the login, the malicious people will not be able to decrypt the new Ciphertext Image without the REAL hardware token. The possibility (P3) to successfully find the window pattern (REAL key and OTP code) is 1.1E−16. Again, it is much tougher than a brute force guess of the 6-digit OTP code. To further protect the confidential cookies that retain a user's confidential data, the present disclosure can adopt the solution in by adding a proxy server. See Wu, M., Garfinkel, S., Miller, R. "Secure Web Authentication with Mobile Phones," DIMAC Workshop on Usable Privacy and Security Software, Jul. 7, 2004, which is incorporated by reference in its entirety. Service provider should add a check button to allow the user to notify server during the login procedure that she is using a public PC or kiosk. So a proxy server will hold the user's web cookies. And the confidential cookies will not be captured by the insecure PC.

3) Man-in-the-middle and Trojan attacks: Man-in-the middle (MITM) can be in the network to intercept the login authentication information for next round use. This is the so called "Replay" attack. REAL Web-based OTP Token can prevent such replay attack with the dynamic OTP code. Certain Trojan may have the capability of obtaining a user's OTP code and its corresponding Ciphertext Image. The intruder may use such information to trace hardware token window pattern (REAL key). If a known OTP code is made up with all 6 different symbols, the possibility (P4) to correctly trace out the 6-window pattern is 1.3E−9 (=1/((C(9,1)^6)×C(10,4)×(11−5+1)). It is more difficult than brute force guess the 6 digit OTP code (=1E−6).

Certain OTP codes 32 may have 1 or more pairs of repetitive symbols. Such OTP code 32 has poor Shannon uncertainty. Special care needs to be taken when making the REAL Image 24 and Ciphertext Image 26. Occurrence of the repeated symbol should be higher than other symbols to maintain a higher Shannon uncertainty.

Given such arrangement, the possibility (P4) to correctly trace out the 6-window pattern can still be maintained well above 1E−6 even if all the six OTP digits are of the same symbol. Since server uses the token's two REAL keys in a random manner, the traced window pattern sequence will be broken by this randomness from server. So the traced pattern provides less valuable information for cryptanalysis. It also increases the security level of REAL Web-based OTP Token security level accordingly.

4) Man-in-the-Middle Seed Tracing Attack: In certain cases, an intruder may capture a series of the OTP codes from a specific user through the Internet. The intruder can then use a mathematic analysis method to reverse trace the secret OTP's key (K). Such scheme can be called Man-in-the-Middle Seed Tracing (MITM Seed Tracing) attack. This seed tracing technique is based on the pseudo random sequence that an OTP generation algorithm inherently has. The intruder may use such pseudo random sequence found in the captured OTP codes to trace the key. Using REAL based OTP token, we can mix two OTP codes (generated by two OTP keys) in a random sequence. So using MITM Seed Tracing technique, the intruder can not find a meaningful pseudo sequence from the captured OTP codes as the codes were coming from two randomly mixed OTP codes. This is advantageous and unexpected over the prior art solutions. The pseudo random sequence is longer in the OTP codes generated by the REAL OTP server and sent through Internet. Since the OTP codes are generated by the OTP server, server will not be confused by this mixture of using two OTP generation keys. This will cause confusion in attackers.

5) Shoulder-surfing Attack: Shoulder surfing attack refers to a malicious people secretly observing a user when she is accessing to a secure web site and uses her OTP token for 2FA requirement. The user may not have any knowledge of such attack. This malicious people can obtain a series of OTP codes from such user. He can then perform the seed-tracing technique as discussed in the prior paragraph (Section D.4). He can even capture the image of REAL OTP hardware token and obtain the REAL encryption key's (transparent window positions) relative positions (may not be precise). The malicious person can further capture the OTP codes to trace the REAL key. Network security can be compromised in these scenarios.

The first problem associated with Shoulder-surfing Seed Tracing attack can be prevented by mixing OTP codes generated from multiple keys. This can be easily done by REAL as described in the prior paragraph (Section D.4). The second problem can not be solved by using the multiple-key method. We can use another method called "Key Position Decoupling". To illustrate the implementation of such method, we can use 7 window openings for a 6-digit OTP token as an example. The symbol seen through the first (most top left opening) window is of multiple functions. This first symbol ($N_6$) will indicate which REAL key (front or rear side of hardware token) to be used for decrypting the OTP code. An odd number will refer to the use of front key. An even number will refer to the use of rear key. A numeral code ($Code_1$) can be obtained by reading the rest of the 6 opening windows. $Code_1$ can be represented as "$N_5N_4N_3N_2N_1N_0$". The OTP code can be obtained by adding N6 to each number in Code, and then taking a modulo 10 operation. In other word, we can add $N_6$ to each $N_i$ and then drop the 10's digit. We then have a final OTP code. The mathematical expression is as follows.

$$\text{New OTP Code} = \text{CONCATNATE}((N_6 + N_i)) \quad \text{Modulo 10}$$

where i=5 to 0.

The New OTP Code will be different from Code, (the code read directly from REAL OTP Token). The modulo 10 operation will effectively decouple the physical REAL key location from the final OTP code. It then prevents the problem causing by the Shoulder-surfing attack.

Limitations

Recent MITM attack has gained new technique. It can work with some Trojan that resides in a PC and has the capability to perform certain actions transparently without any user's knowledge. In some case, it may redirect the user to a fraudulent web site to collect a user's data, and then redirects back to the genuine web site after the data collection. It may imitate a user from user's own PC to interact with genuine web site. Such MITM and Trojan attacks present new challenges to entire network and data security industry. 2FA system alone can not solve this issue. See Schneier, B. "The Failure of Two-factor Authentication" Communications of the ACM, April 2005, which is herein incorporated by reference in its entirety. It will require layered security schemes, tools and disciplines to make up a better protection system. REAL Web-based OTP Token can then become one of the key components to make up such a better secured system solution.

CONCLUSION

One-time Password (OTP) token has the capability to automatically generate a dynamic session password 32. It is a leading password technology in today's Two-factor Authentication (2FA) System. But it has certain deficiencies in token cost, difficult to carry, high deployment and support expenses. In particular, many of the implementations may comprise the security when token is lost, stolen or secretly copied. The present disclosure presents a novel Rubbing Encryption Algorithm (REAL). REAL 24 has its strength in securely encrypting short word length data such as an OTP code. REAL encrypted data 24 can be securely transmitted and displayed in a remote PC or even a public Internet Kiosk. Furthermore, REAL 24 decryption does not need to enter encryption key into a client PC or mobile device. It protects the secrecy of encryption key and allows the use of a much higher complexity key. A user can use an inexpensive non-electronic hardware token to electronically "rub" (decrypt) the original data from Ciphertext Image shown on PC screen. An OATH compliant REAL Web-based OTP Token 10 is implemented and analyzed. REAL Web-based OTP Token 10 has better security level than the regular hardware or software tokens. Credit card like REAL hardware token is inexpensive and easy to carry. REAL can be implemented in multiple dimension form factor also. It has potential to be used in other applications. REAL can also be further enhanced on its security strength.

One-time Password (OTP) Token can automatically generate a series of dynamic passwords. It has gained a leading position in the Two-factor Authentication (2FA) system for better network security. As the cellular phone became popular in the past few years, many solutions were proposed to embed the OTP Token inside such mobile devices. See RSA, *RSA SecureID, Software Authenticator*, Mizuno, S., Yamada, K., Takahashi, K., Authentication *Using Multiple Communication Channels*. In: DIM 2005, Nov. 11 (2005) and Kostiainen, K., Ekberg, J. E., Asokan, N.: *On-board Credentials with Open Provisioning*, ASIACCS 2009 (March 2009), which are all incorporated by reference in their entirety.

But they encountered certain deficiencies such as the mobile token can not fully resist OTP seed (K) tracing by Man-in-the-middle (MITM) OTP code interception and Shoulder-surfing security attack. Other issues include poor interoperability and compliance with existing authentication systems, plus higher deployment and support cost. In particular, many proposals store the OTP generation seed and personal secrecies inside the cellular phone. It compromises network security when the phone is lost or stolen.

To address the aforementioned issues, the present disclosure provides a Rubbing Encryption Algorithm (REAL). A user does not need to memorize and enter the key when decrypts a ciphertext by REAL. This special feature allows REAL to use a very long and complex key for encryption. So REAL can securely encrypt a short word length OTP code with very high security level. That is why the locally stored REAL OTP codes (stored inside the mobile phone) can retain its security even if the phone is lost or stolen. A user can lay the hardware token over the REAL ciphertext image on a cellular phone's screen to electronically "rub" (decrypt) the OTP code. This is why the cipher gets its name "Rubbing Encryption ALgorithm" (REAL).

Turning to FIG. 8, there is shown a flow chart illustrating one procedure of the system 110 of the present disclosure. The flow may be implemented by hardware or software components as shown and as understood to one of ordinary skill in the art. The system 110 has a REAL cipher and Mobile OTP Token operation procedure and includes the step of generating an Oath Compliant OTP code shown as step 112. The method 110 commences at step 134 where a token is activated and then a user credentials are keyed in. The method 110 then passes to step 118, step 130 and step 132 simultaneously. In step 118 the flow obtains data HI and generates an offset value at step 122. The method 110 also passes to step 132 and step 130 as will be discussed below. Thereafter, the method 110 passes to step 132 where a local encryption key is generated. Thereafter, the method 110 passes to step 130 where data is stored in the local device 146 (not shown but shown in FIG. 10A). Thereafter, the method 110 passes to step 128 to provide for decryption. Control then passes to steps 126 and 124 where a DELTA is generated when DT is decrypted in step 128 and BIT/XOR operations are performed on DELTA and the OFFSET from step 122 and as yielded in the section below and then control of the method 110 passes to step 120 where data is generated. A REAL image is then created at step 116. The REAL image is then communicated to step 114 where the REAL image is decrypted with a REAL key. The method 110 then passes to step 112 to generate the OTP code.

System 10 also shows the steps for provisioning of the OTP codes and storage of the codes into local mobile device. Turing to FIG. 8 again, during the provisioning process, a long series of OTP codes are generated at step 112 using the designated OTP generation algorithm (now shown in FIG. 8). These long series of OTP codes are then encrypted by the REAL key using Rubbing Encryption Algorithm at step 114. A REAL Image is then generated for each encrypted OTP code in step 116. Such REAL Image is then converted into DATA in step 120. An HI is generated in step 118. Such HI is then used to generate OFFSET in step 122. DATA and OFFSET are then BIT-EXCLUSIVE-OR'ed to generate DELTA 126 in step 124. System 110 then takes the user's credential from step 134 to generate an local encryption key at step 132. This encryption key is then used to encrypt the DELTA in step 126 and generates DT and HI to securely store in a local mobile device.

The present disclosure also provides a REAL Mobile OTP Token 136. This token 136 is compliant to the OTP token proposed by the Initiative for Open AuTHentication (OATH). A cellular phone is used as the OTP generating platform as shown in FIG. 10A, but the present disclosure is not limited to any such mobile device application and may be used with a netbook, laptop, desktop, PDA, network access device, ATM or the like. Such token 136 is fully interoperable with the existing authentication system. A low cost plastic card is used as the REAL key (code pointer) bearing hardware token 136. OTP codes are pre-generated using the OATH's event-based OTP code algorithm. The codes are encrypted by a specific REAL key 136 assigned to a user.

The confidential REAL encrypted OTP codes are stored in the Data File. The OTP generation program and each user's Data File are provisioned and downloaded through the Internet. After installation, the user activates the OTP generation program. User lays her hardware token over the REAL ciphertext image on the phone's screen to obtain the OTP code. The user then enters this OTP code into the login window to complete the 2FA process. Each REAL hardware token 36 carries one key on each side (shown in FIG. 9A-9B) of the token 136. Three versions of the REAL Mobile OTP Token 136 are implemented and demonstrated as examples to illustrate the use of REAL. The basic version works with codes from just one OTP generating seed. It provides the basic secure OTP code. An improved version works with OTP codes from two different OTP generating seeds. The token matches the two code generation seeds with the authentication server automatically. So a valid OTP code will not be mistakenly rejected. This token 136 can resist attack on OTP seed (K) tracing by MITM data interception attack.

The third version 136 is similar to the second version but the REAL key is dynamically decoupled from the code pointer's physical locations on the hardware token. This version can resist both the Shoulder-surfing and the seed tracing from MITM interception attacks.

Several implementations have emerged as the key methods to use a cellular phone in remote network authentication. One such solution focuses on using cellular phone as a standalone OTP token. The mobile device is used as a computational platform to generate OTP code. These tokens usually do not have any capability to resist the OTP seed (K) tracing by MITM interception and Shoulder-surfing attacks.

It stores the secret seed (K) and counter value in the phone. So the network security may be comprised if the phone is lost or stolen as the secrecies can be exposed. An alternative proposal focuses on using the cellular network as a secure out of band channel to transmit or receive the OTP code to or from the authentication server. The OTP code is transmitted as an image data or through the Short Message Service (SMS) in text form. This new channel effectively prevents the traditional MITM attack. But Shoulder-surfing attack is still an issue. Cellular QoS (quality of service) will affect the reliability of OTP generation when using cellular SMS. SMS is a best effort delivery service. Cellular service providers cannot guarantee a real-time or in-time delivery.

Moreover, when a user is out of the cellular service coverage area, such as in a basement of the building or in the rural area, using SMS sometimes is not even possible. Besides, new software and hardware are needed to allow the authentication server to interface to SMS system. All these increase the total system cost and complicate the server management task.

The third and most recent approach involves using Subscriber Identity Module (SIM) on a cell phone and other newly proposed protocols such as the Liberty Alliance Federation Standard (See Aloul, F., Zahidi, S., El-Hajj, W.: Two Factor Authentication Using Mobile Phones, 2009 IEEE/ACS International Conference on Computer Systems and Applications (2009), which is herein incorporated by reference in its entirety) or The Free Auth Project (See Liao, K., Sung, M., Lee, W., Lin, T.: A One-Time Password Scheme with QR-Code Based on Mobile Phone, doi: 10.1109/NCM.2009.324, which is herein incorporated by reference in its entirety) to perform the authentication procedure.

In this scheme, the mobile device also carries part of the authentication secret information. The authentication is carried out directly through the phone, cellular network to the remote server. Again, QoS of authentication are limited by cellular service coverage area. In particular, using different authentication protocols and OTP algorithms usually leads to a new authentication system. New software and hardware are required at server to implement such scheme as the proposed solutions are not fully compliant with the existing authentication servers. Though this approach may prevent the traditional MITM attack, the Shoulder-surfing attack may still be an issue.

Overall, a standalone cellular phone-based Mobile OTP Token has its merits. It can be easily implemented to have full compliance with the existing infrastructure. No additional cost and server work are required for such token. Its usage is also not limited by the cellular service's coverage. But the present disclosure needs to resolve the security issues associated with this approach. The REAL Mobile OTP Token provides these benefits and overcomes these problems in the art.

REAL Encryption Procedures

FIG. 8 shows the general REAL encryption procedure. For ease of discussion, a REAL Image X of size 40 and the set of symbol with numerals of 0 to 9 are chosen to illustrate the proposed algorithm.

Key Generation.

REAL derives its encryption key from the specific spatial data on REAL Image. Since REAL can encrypt and display ciphertext data in multiple dimensional form factor, its encryption key can be of the same multiple dimensions as well. The REAL key is embedded on its hardware token generally shown in FIGS. 9A and 9B.

Figure 9A:
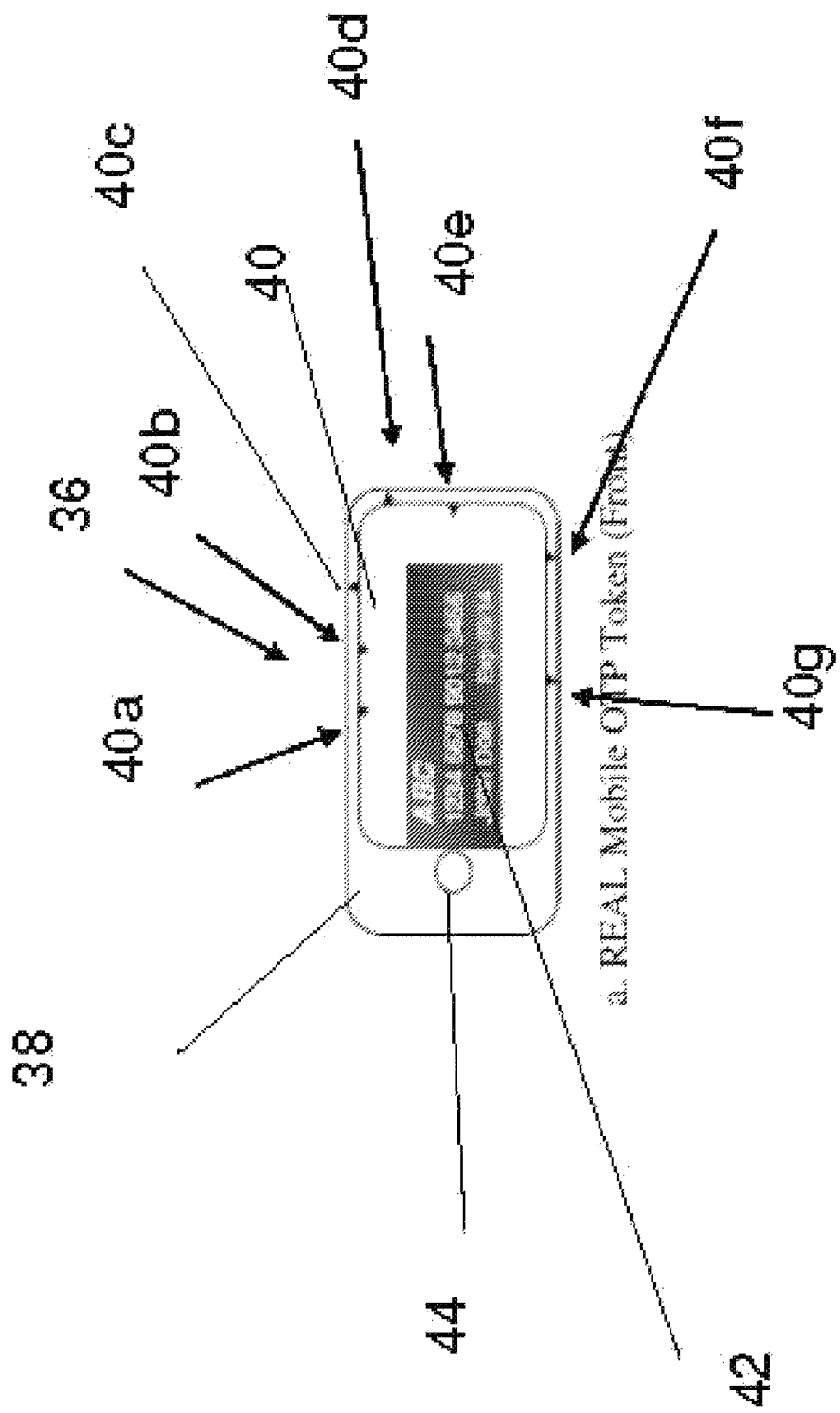
FIGS. 9A and 9B show a front view and a rear view of an access token according to the present disclosure.
Figure 9B:
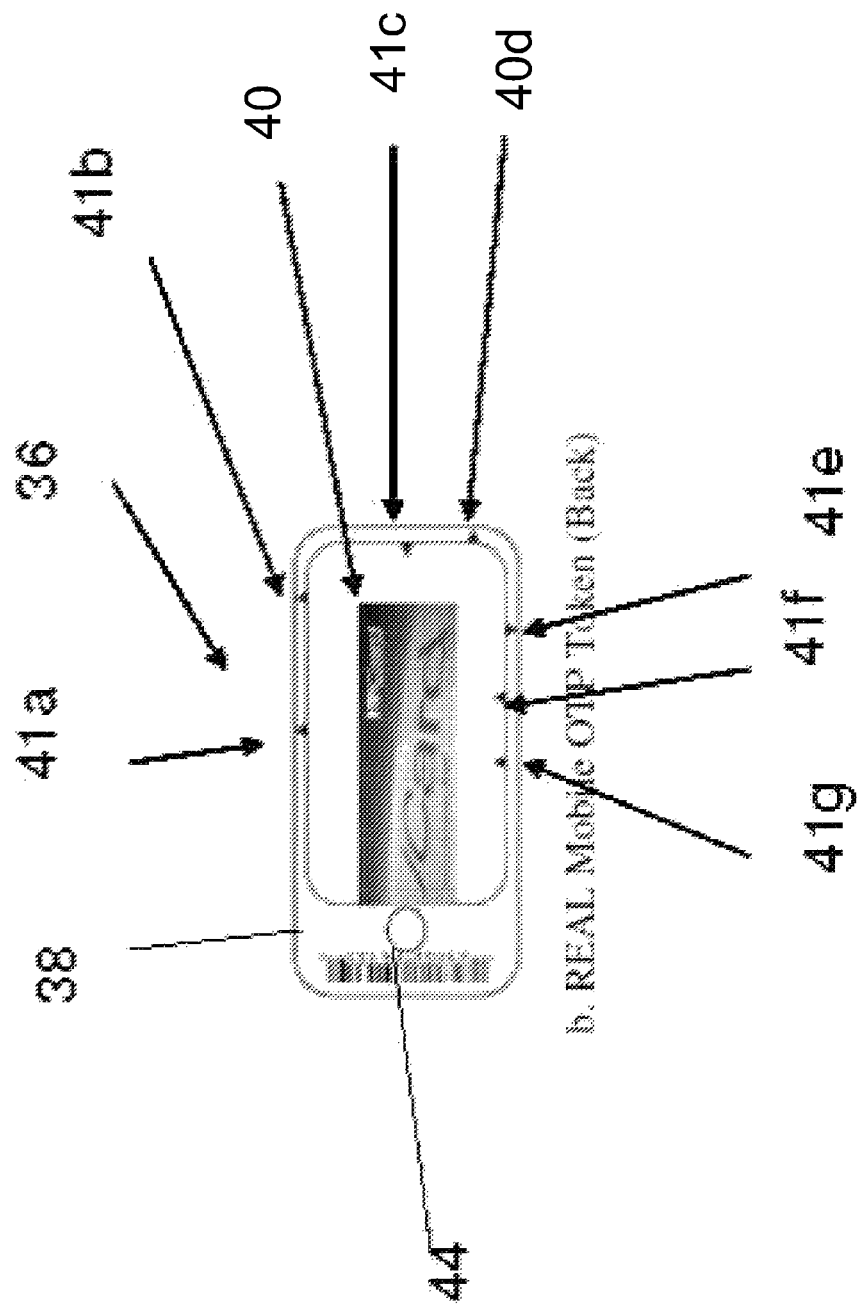

Turning now to FIGS. 9A and 9B, there is shown a token 136 that includes a body 138 and an aperture 144 for a key chain or fastener or the like to wear the token as a badge. Preferably, the token 136 comprises identification data 142, such as a company name, company address, bar code, phone number, employee or user name and photo or the like. Various different indicia may be displayed as data 142 and the present disclosure is not limited to any specific indicia as the token 136 can be formed with no indicia thereon. The token 136 also comprises a periphery portion 140, which remains transparent so the token 136 and the periphery portion 140 can be overlaid over a display 148 (FIG. 10A) to obtain the OTP code as discussed herein.

To generate a key, the present disclosure first chooses a desired REAL Image form factor that fits well with the given display screen 148 size and an easy reading symbol font size (as shown in FIG. 10a.). The encryption key is the character locations that display the plaintext symbols in a REAL Image. Given a two dimensional REAL Image with a plastic card (REAL hardware token 136), the present disclosure can randomly place pointers or markings 140a-140g or markings 141a-141g around the card's periphery 140 as REAL key. For D characters of plaintext, the present disclosure uses "D+n" number of pointers 140a-140g or markings 141a-141g as REAL key. In the example, the present disclosure allows n to be equal to 1, however, n can be larger depending on the application and desired security level.

Turning now to FIG. 9A, the extra one pointer is used as the indicator to choose either front side or back side of the token (FIG. 9A or FIG. 9B) during the REAL operation. Locations of the pointer 140a-140g or markings 141a-141g can be denoted as Wi where i=0 to D. FIG. 9A-10C shows an example of such a REAL hardware token 136 with seven code pointers 140a-140g for a 6-digit OTP code. In this example, the present disclosure has two different sets of key on each side of the token 136 shown as markings 140a-140g or markings 141a-141g.

The present disclosure can find the total possible number (N) of key or total number of different hardware token 136 from the equation $$N = C(T, (D+1)). \tag{5}$$

Given a REAL Image size of 40 (T) and OTP code size of 6 (D), the present disclosure can have 18.6 million different tokens or keys (on each side of token 136). Each token 136 can only decrypt its own encrypted REAL Image (REAL ciphertext). Generating REAL Image is made by the REAL placing the plaintext's symbols into the corresponding Wi locations in REAL Image 150 and 152 according to each symbol's occurring sequence.

The present disclosure uses the following example to illustrate REAL Image's generation. Assuming D=6 and plaintext code=807235, the present disclosure then have D5=8, D4=0, D3=7, D2=2, D1=3 and D0=5 as the plaintext symbols. Row I and Row II of Table 1 show how the plaintext symbols can be randomly assigned to each Wi location. The pseudo code to generate such REAL Image is shown as follows.

| REAL_Image_GEN(K, i, T) | |
|---|---|
| 0 | OTP(i) = Truncate(HMAC-SHA-1(K, i)); |
| 1 | OTP(i) = Concatenate (D_5|D_4| D_3|D_2| D_1|D_0); |
| 2 | Sequentially placing D_5 through D_0 into the corresponding W$_i$ locations of the REAL Image; |
| 3 | Fill in an odd random number (3 in our example) in W$_6$ to indicate using key on the front side of the token; |
| 4 | Fill the rest of REAL Image elements with randomly chosen symbols so that the Image reaches equiprobable state,   //This is REAL_Image(i); |
| 5 | DATA(i) = Concatenate(elements of REAL_Image(i)); |
| 6 | End of program. |

In this pseudo code, K is a 160-bit randomly chosen OTP seed, i is the event counter value, T is the REAL Image size and REAL_Image(i) is the encrypted OTP code generated from OATH OTP formula as shown in step 0. See M'Raihi, D., Bellare, M., Hoornaert, F., Naccache, D. Ranen, O.: HOTP: *An HMACBased One-time Password Algorithm, the Internet Society, Network Working Group.* RFC4226 (December 2005), which is herein incorporated by reference in its entirety. DATA(i) is the concatenation of all the elements of the REAL_Image(i).

TABLE 1

Generating a REAL Image

| | W$_6$ | W$_5$ | W$_4$ | W$_3$ | W$_2$ | W$_1$ | W$_0$ |
|---|---|---|---|---|---|---|---|
| I | D$_6$ | D$_5$ | D$_4$ | D$_3$ | D$_2$ | D$_1$ | D$_0$ |
| II | 3 | 8 | 0 | 7 | 2 | 3 | 5 |

Offset Generation. To further protect the plaintext data, REAL does not store the encrypted DATA(i) directly. A random value (Offset) is used to generate a logic operation difference (Delta) between DATA(i) and Offset (i). Delta then indirectly represents its corresponding REAL ciphertext. By safely guarding the random Offset, Delta is very secure and so is the REAL Image. Offset (i) is generated by a one-way hashing operation from the (i−1)th index value. This hashed index value is called HI. Offset(i) generation procedure is shown in the pseudo code below.

```
Offset_GEN 0  i = 0,          //initialize program loop counter;
1  HI(0)= TRUNCATE(HMAC-SHA-1(K_1, 1)), //K_1 is a 160
   bit random number;
2  Bit_159 to Bit_0 = HMAC-SHA-1(HI(i), 1);
3  Bit_319 to Bit_160 = HMAC-SHA-1(HI(i), 19);
4  Offset(i) = Concatenate(Bit_319 to Bit_0);
5  i = i + 1;
6  HI(i) = TRUNCATE(HMAC-SHA-1(HI(i-1), 1));
7  If i > Max_Count, go to Step 8,    //Max_Count =
   total counts of DATA(i);
8  End of program.
```

Delta Table (DT) is made as follows. Delta(i) is the Bit-Exclusive-OR (B-XOR) difference between the related DATA(i) and Offset(i). Their relationship can be described as $$\text{Delta}(i)=B\text{-XOR}(\text{DATA}(i),\text{Offset}(i)). \tag{6}$$

Delta Table (DT) is the compilation of the entire Delta(i) in a special relationship to the corresponding HI(i). That is, Delta(i) is not stored according to the original sequence of DATA(i). Delta(i) is rearranged to follow the value significance of its related HI(i). The new tabulated Delta(i) form the DT. DT and the last HI data will then be further encrypted and securely stored in the designated device.

REAL Decryption Procedures

To decrypt a REAL ciphertext, the present disclosure mainly follows the procedures of section 3.2 but in a reversed order (FIG. 8). Obtaining the last HI(i−1) and Delta(i) value is the first step. A new HI(i) value is generated using the procedure shown in step 8 of Offset_GEN listed in Section 3.2. Once HI(i) is available, Delta(i) can be found by sorting through Delta Table (DT). Following the same step 2 through 4 procedures shown in Offset_GEN, Offset(i) can be generated from HI(i). DATA(i) can then be obtained through the Bit-Exclusive-OR operation of Delta(i) and Offset(i). Subsequently, REAL Image(i) can be reconfigured from DATA(i). By overlaying the unique REAL hardware token 136 on top of the REAL Image(i), the plaintext data will be (rubbed out and) indicated by the pointers 140a-140g or markings 141a-141g on the token 136 (as shown in FIG. 10b).

Design the Secure REAL Mobile OTP Token

The present disclosure provides that the REAL Mobile OTP token 136 will work as a standalone token 136. It will be fully compliant to existing OATH server, inter-operable with other OATH tokens and easy to deploy and low support cost. The network security will not be compromised even if the phone is lost or stolen. Moreover, the token 136 will have the capability to resist security attacks such as OTP seed tracing by MITM code interception or Shoulder-surfing.

REAL Mobile OTP Hardware Token

The present disclosure is shown as a plastic card 136 with the size of 1"×2" as hardware token 136 (as shown in FIGS. 9A and 9B). The material of the present disclosure token conforms to credit card's ISO/IEC FDIS 7810 standard which is located at the International Organization for Standardization.: ISO/IEC 7810:2003. Nov. 17 (2009), and which is incorporated by reference in its entirety. The token 136 can be easily put on key chain via aperture 144 or kept in a wallet. It should be appreciated that it may be placed in other locations as well, for example, a key or the like.

The REAL encryption key is embedded on the token 136 by the code pointer's 140a-140g or markings 141a-141g locations. The code pointer 140a-140g or markings 141a-141g is the solid black triangle printed on the token periphery 140. The token making process is very similar to a regular credit card. So the cost of this hardware token 136 is comparable to a credit card. Care should be exercised that the pointers 140a-140g or markings 141a-141g are placed in an accurate location during printing via the size of the data items.

FIG. 9A shows that the token's 136 periphery 140 is transparent. Overlaid symbols 150 and 152 can be clearly read through the token 136. b. Barcode serial number 142 is printed on the back side to correlate the token 136 with the specific REAL encryption keys 150 and 152. One token 136 carries two set of keys with one each on the front and back side as shown in FIG. 9A and FIG. 9B. REAL Image 150 and 152 will indicate which set of key to be used. Preferably, the image 150 and 152 has an indicator to indicate which side of the token 136, the front or the back, is to be used. For example, the first digit of columns 150 and 152 indicate a number. The number is odd or even. Here, the odd number will indicate use of one side while the even number will indicate the user of the other side. This will be communicated in advance to the user and will not be printed anywhere on the token 136. In another embodiment, the indicator may be a letter, such as uppercase or lower case, or may be a symbol, like an arrow. Various configurations are possible and within the scope of the present disclosure.

REAL Mobile OTP Client Software

REAL Mobile OTP Token 136 has two major parts of software. They are Program File and Data File. The Program File contains a set of executable programs to generate the REAL Image on display 148 of FIG. 10A and other housekeeping tasks. All the pre-generated OTP codes are encrypted by REAL and stored as Delta Table (DT) 126 inside the confidential Data File of FIG. 8. Data File consists of DT and last HI value as shown by reference number 118 in FIG. 8. The entire Data File are generated right after a user securely logins and activates the REAL Mobile OTP Token provisioning work. The confidential Data File is encrypted by server using a key (LK) generated from user's credential information (UC) as shown in the following pseudo code.

$$LK=\text{HMAC-SHA-1}(\text{HMAC-SHA-1}(UC,UC),UC), \tag{7}$$

where UC is the user credential information such as the userID, password or PIN. The encrypted Data File and Program File are zipped together after provisioning and can be downloaded into a user's cellular phone 146 of FIG. 10A through a secured Internet connection. After the auto-installation, both the Program File and the encrypted confidential Data File are securely ported to the cellular phone 146. Various other configurations are possible and the above statements to a phone and the like form no limitation to the present disclosure and are merely illustrative.

Using REAL Mobile OTP Token

Once the Program File and Data File are properly installed, a user can activate the token 136 through cell phone's 146 screen 148 or menu. After keying in the user credential information (UC), the phone 146 will display a REAL Image 150 and 152 and 154 as shown in FIG. 10a.

Turning now to FIG. 10A, there is shown a component display generally shown as reference numeral 148 that is supported on a housing 146. The component 148 may be a mobile phone or can be limited to a communication device such as an IPHONE®, IPAD®, HTC® ANDROID® PHONE®, DRIOD®, but also may include a touch screen tablet computer, IPAD®, BLACKPAD® or the like or any other display known in the art. The display 148 preferably displays a series of icons or the like generally shown in a U shaped pattern or a first series 150 and a second series 152 separated by a partition 154. Preferably, the series 150 and 152 can be alphanumeric, letters, numbers, symbols, pictures, photos or any other visually discernable information known in the art.

Turning now to FIG. 10A, the user takes a first side of the token 136 and overlays the token 136 over the display 148 so the periphery 140 is placed with a lateral side on the partition 154 of the display 148. An edge of the token 136 is placed directly in contact with partition 154 as shown. The user then looks at the first marking 140a or the first marking 141a to determine whether the user should use the front side of the token 136 or the rear side of the token 136. If the first marking 140a points to an even number, then the user is instructed to use the rear side. If the first making points to an odd number, then the user should use the front side to decrypt the code.

It should be appreciated that the present disclosure can be formed with one column of data 150 or one column of data 152, or two columns 150 and 152 as shown or more than two columns of data 150 and 152 or more than three, etc. In another embodiment, the token 136 may have one side or three sides or more.

Turning now to FIG. 10B, the user uses the markings 140a-140g on the token 136 to pick certain numbers of the series 150 and 152. As can be seen from the markings 140a-140g, the markings point to a certain direction toward one of the series 150 and 152, which is used to decrypt the series 150 and 152 provided on the display 148. As can be seen at the second marking 140b, the marking 140b points to the number "8" of the series 152 and the third marking 140c, points to the number "0", and the fourth marking 140d points to the number "7", and the fifth marking 140e points to the number "2" and the sixth marking 140f points to the number "3" and the seventh marking 140g points to the number "5" to reveal the code "807235".

Turning now to FIG. 10C, the user uses the markings 141a-141g on the token 136 to pick certain numbers of the series 150 and 152. The user overlays and properly aligns her hardware token 136 (always using front side first) on the screen 148 to decrypt (rub) the OTP code as shown in FIG. 10b. The first pointer points to a symbol $N_{1f}$ with a value of 3. Since $N_{1f}$ is an odd number, it means that the present disclosure should use key 136 on the front side to rub OTP code. If $N_{1f}$ is an even number, the present disclosure should use key 136 on the back side. OTP code rubbing sequence starts from the most top left symbol on outer ring and begins from the second pointer 140a-140g or markings 141a-141g (pointing to a symbol $N_2$) location. $N_i$ is D(7−i) of the OTP code. Following this method, the present disclosure can find the OTP code as 807235. In FIG. 10c, $N_{1f}$ is 8. Using the back side code pointers or markings 141a-141g, the present disclosure finds the OTP code to be 478818.

As can be seen from the markings 141a-141g, the markings 141a-141g point to a certain direction toward one of the series 150 and 152, which is used to decrypt the series 150 and 152 provided on the display 148. As can be seen at the second marking 141b, the marking 141b points to the number "4" of the series 150 and the third marking 141c, points to the number "7", and the fourth marking 141d points to the number "8", and the fifth marking 141e points to the number "8" and the sixth marking 141f points to the number "1" and the seventh marking 141g points to the number "8" to reveal the code "478818".

Token that Resists Certain Security Attacks

Man-in-the-Middle (MITM) can be in the network to intercept a user's static password for next round use. This is the so called "Replay" attack. The OTP's dynamic password has successfully thwarted such attack. See Lamport, L.: Password Authentication with Insecure Communication. Communications of the ACM 24(11), 770-772 (1981), which is herein incorporated by reference in its entirety. REAL Mobile OTP Token 36 (MR1 Token) also has the same capability to prevent such MITM replay attack.

1. Man-in-the-middle Seed Tracing Attack data intercept attack. MITM can obtain series of OTP codes by continuously intercepting a user's login password. Even with a dynamic password, a hacker can try to trace the seed (K) through the pseudo random sequence the captured passwords show. This is a direct attack on an OTP algorithm. If the intruder has enough pseudo random number data base and computation power, he can find the seed that generates the OTP code. A traditional OTP token can not resist such attack effectively. An improved REAL Mobile OTP Token 136 can provide extra protection when such event happens. The present disclosure titles this version an Ms. OPT (Multi-Seed OTP Token) 136. Each user will be assigned with multiple, for example two or more sets of OTP generating seed ($K_A$ and $K_B$). The user will use one of the two OTP tokens 136 each time but in a mixed random order. The OTP codes generated by token A will be encrypted by the REAL key on front side of token. Token B will use the REAL key on the back side to encrypt and decrypt its OTP codes. So even though the user carries only one REAL Mobile OTP hardware token 136, he actually has two tokens at all times.

The first symbol ($N_{1f}$) pointed by the first pointer 140a-140g on the front side is still used as the indicator to select front and back side's key. During the REAL Image generation procedure, an odd number of $N_{1f}$ is used when an OTP code is from token A and an even N1f is used with an OTP code from token B. The authentication server will know the sequence of which token 136 is used as the entire provisioning work is done by server itself. A user can operate as if she has only one token 136. The two pseudo random OTP codes are used in a mixed random order determined by the server. So the intercepted OTP codes can no longer provide a meaningful pseudo random sequence. It makes random number seed tracing very difficult if not impossible. This attack is then prevented.

Shoulder-Surfing Attack.

Shoulder-surfing attack happens when a malicious person secretly observes the action and screen while a user is using her OTP token 136. The malicious person may then have the REAL Image 150-154 and code pointer information 140a-140g and 141a-141g to retrace the secrecy or OTP code. He may not have the OTP code as the code usually displays in other non-numeric symbols during the login process. To fend off such attack, the present disclosure employs a random offset to decouple the direct relationship among pointer locations and OTP code symbols in REAL Image 150-154. Token 136 of such feature is called MR3 Token. The first symbol ($N_{1f}$) pointed by the first pointer 140a-140g on the front side is still used as the indicator to select front and back side's key. $N_{1b}$ means the first symbol, number, picture, image, data set, or character pointed by the first pointer on the back side of the token 136. But both $N_{1f}$ and $N_{1b}$ will be used as an adder to each symbol's numeric value pointed by the rest of the six code pointers 140b-140g or 141b-141g. The ten's digit will be dropped if the added value is greater than or equal to 10. The general equation is as follows.

$$D_{if} = (\text{Value of } N_{1f} + \text{Value of } N_{(7-i)f}) \bmod 10, \tag{8}$$

$$D_{ib} = (\text{Value of } N_{1b} + \text{Value of } N_{(7-i)b}) \bmod 10, \tag{9}$$

where $D_{if}$ is the ith digit of OTP code and $N_{(7-i)f}$ is the symbol pointed by its corresponding (7−i)th pointer when using REAL key on front side. When making the REAL Image, each $N_{(7-i)f}$ value should be adjusted according to equation (8).

In FIG. 10b, the $N_{1f}$ is equal to 3, an odd number. The present disclosure uses the key on front side of hardware token 136 to rub the OTP code. The second pointer indicates $N_{2f}=8$. From equation (8), the present disclosure finds $D_{5f}=1$. Following this new decryption procedure, the present disclosure has the full OTP code as 130568. The REAL Image in FIG. 10.c shows $N_{1f}=8$, an even number. The present disclosure uses a REAL key on the back side to decrypt the OTP code. This code is actually generated from Token B. The first pointer on the back side shows a number $N_{1b}=6$. The present disclosure calculates $N_{2b}=4$. So $D_{5b}=0$. Following the procedure, the present disclosure can obtain the full OTP Code as 034474. $N_{1f}$ and $N_{1b}$ are randomly chosen by the server or alternatively by another entity and the modular operation also adds further randomness to the codes. The codes obtained from FIG. 10.b and FIG. 10.c show no physical direct relationship with the original code pointer 140a-140g and 141a-141g locations. It then retains the security and resists the attack from Shoulder-surfing. This is very advantageous and will serve to protect the system even though portions can be captured by unauthorized individuals. Such a token 136 is also called Mr. OTP Token or Multi-Radom OTP Token).

For a 5,000 pre-generated OTP codes stored in a REAL Delta Table, the entire code size is about 200 KBytes. It is sufficient for a consecutive 2.7 years use with an average daily usage of 5 OTP codes. The entire software code size of REAL Mobile OTP Token 136 is less than 3 Mbytes. Both software program deployment and technical support can be easily done through Internet. There is no need to change or add any hardware or software on the existing OATH authentication server. The hardware token 136 can be made, delivery and activated following the same logistic like credit card. It helps to achieve easy deployment and low cost operation. The token 136 uses the same OATH OTP algorithm to generate the OTP codes. It ensures that the OTP codes are 100% compliant to any OATH authentication server.

As long as both tokens 136 use the same key (K) and counter value (C), REAL Mobile OTP Token 136 can maintain full interoperability with other traditional OATH compatible OTP tokens. The token 136 can directly replace any existing or expired OATH OTP token.

OTP Code Security and Integrity

The plaintext OTP code is generated by the same OATH algorithm. The REAL decrypted OTP code is as secure as the one generated by an OATH compatible token 136. A detailed OATH OTP code security analysis can be found in Appendix A of RFC4226, See M'Raihi, D., Bellare, M., Hoomaert, F., Naccache, D. Ranen, O.: HOTP: An HMACBased One-time Password Algorithm, The Internet Society, Network Working Group. RFC4226 (December 2005), which is herein incorporated by reference in its entirety. REAL encrypted OTP codes are encrypted again by Hashed Index (HI) value when they are placed into Delta Table (DT). DT and HI value are further encrypted using a key (LK) generated by user credential data. It prevents these data from being tampered. They provide the desired level of integrity and security protection.

Real Image Security Level

REAL Image 150-152 (RI) contains the OTP code. Its security level affects how secure the OTP code is protected. Given an image size of 40 (T) and a 6-digit (D) OTP code, equation (5) shows a total number of 37.2 million different code pointer 140a-140g and 141a-141g patterns (REAL key) can be embedded on both sides of the hardware token 136. Without the aid of the hardware token 136 and a known OTP code, to guess the correct key from a REAL Image 150-152, the possibility ($P_1$) is 1 out of 37.2 million. Even with a known REAL Image 150-154 alone, equation (5) also shows that to directly guess the correct 6-digit OTP code the possibility ($P_1$) is 1 out of 3.8 million.

On the other hand, a traditional OATH token display the full OTP code right on the screen without any encryption. The chance ($P_1$) to obtain the correct code from the image on the LCD screen will be 1 out of 1. If just considering the displayed image alone, REAL OTP Token's security level is much stronger than a traditional token. In other word, REAL securely encrypts the 6-digit OATH OTP code inside the REAL Image. So REAL does not degrade the OATH OTP code security level.

Security Attacks

Man-in-the-middle (MITM) Replay Attack is a decades old problem. A dynamic password from an OTP token such as the present disclosure MR1 token can successfully thwart such attack. See Lamport, L.: Password *Authentication with Insecure Communication. Communications of the ACM* 24(11), 770-772 (1981), which is herein incorporated by reference in its entirety. The MS. OTP Token is a two OTP tokens 136 in one physical token form. It can send a stream of OTP codes generated from two different OTP tokens 136 in a mixed random order. The intercepted OTP codes by MITM are just a randomly mixed number series. The original pseudo random sequence of an OTP generating algorithm is broken and difficult to trace. So MS. OTP Token can resist the OTP seed tracing by MITM interception attack. The MR. OTP token randomly decouples the REAL key from its hardware token code pointer's physical locations. It effectively breaks the key and pointers' 140a-140g and 141a-141g physical linking information that a malicious person tries to get. Combining both Mr. OTP Token and MS OTP Token, we can successfully resist the attack from Shoulder-surfing and Seed tracing by MITM code interception. Accordingly, the present disclosure provides for a security attack safe REAL OTP token.

Other Security Concerns

1. Cellular phones and PDAs 146 may be lost or stolen. Cellular phone 146 is small and prone to get lost or stolen. Having a user's phone that contains REAL OTP token 146, a malicious person has to crack the user's credential first before activating the REAL OTP function. Even if the cellular phone 146 is activated, trying to correctly guess the OTP code with a known REAL Image 150-154 but without the specific hardware token 136, the possibility ($P_1$) is 1 out of 3.8 million. It is much tougher than a brute force guess the 6-digit OTP code (1 out of 1 million).

2. Hardware token 136 is lost, stolen or secretly copied. A regular software or hardware token is a standalone OTP code generator. The loss of such token means losing all the future OTP codes. REAL hardware token 136 does not contain any electronics to generate OTP code. The token 136 will only work with a specific cell phone 148 that has the user Data File. So losing a REAL hardware token 136 or the pointer pattern 150-152 being photo copied, the security will not be compromised. Having hardware token 136 alone, the possibility ($P_2$) to correctly guess the OTP code is like to guess a correct REAL Image 150-154. The possibility ($P_2$) is 1 out of $10^{40}$. It is $10^{34}$ times tougher than a brute force guess of the 6-digit OTP code.

3. Confidential File is secretly copied or stolen. A malicious person may copy the user specific confidential Data File without user's knowledge. The person can then set up a cell phone 146 that imitates the user's REAL Mobile OTP token 136 environment. It can generate correct REAL Image 150-

154 independently. But the intruder will face the difficulty of guessing the correct OTP code without the hardware token 136 even if user credential information is correctly guessed. Intruder will then meet the difficulty of probability $P_1$ (1 out of 3.8 million) that we discussed previously.

Limitations.

Security attack technique advances daily. Trojan and MITM attack though not found in the cellular phone today, they have successfully infiltrated the PCs world and created huge damages. The existing 2FA system alone can not solve this issue. See Schneier, B.: The Failure of Two-factor Authentication. Communications of the ACM (April 2005), which is herein incorporated by reference in its entirety. Layered security solutions and discipline are needed. REAL Mobile OTP Token will become part of the security solutions for this new challenge.

CONCLUSION

Using cellular phone 146 as a One-time Password (OTP) token to generate dynamic session password is becoming popular recently. But it has met certain difficulties. Some of the solutions can not fully prevent the OTP seed tracing by MITM code interception or Shoulder-surfing security attacks. Other have issues regarding poor compliance and interoperability with existing authentication infrastructure, geographical limitation due to poor or no cellular service, plus high deployment and support cost.

In particular, many of the implementations may comprise the security when phone is lost, stolen or data file is secretly copied. A Rubbing Encryption Algorithm (REAL) is used as the base cipher for a new Mobile OTP Token 136. REAL decryption does not require entering encryption key on local computing device. It allows REAL to use a long and complex key to encrypt a short word length plaintext such as the OTP codes. This feature ensures high level of security on REAL ciphertext (REAL Image). The ciphertext

| Item | Web-based OTP Token | Mobile OTP Token |
| --- | --- | --- | can be securely stored in a cellular phone 146 even if the device gets lost or stolen. A user can use an inexpensive non-electronic plastic hardware token 136 to electronically "rub" (decrypt) the OTP code from the phone screen's REAL Image. The present disclosure implements and analyzes an OATH Compliant Mobile OTP Token using REAL. This token 136 is in compliant and interoperable with existing authentication infrastructure. Token's 136 deployment and support is easy and with low cost. The token 136 also has capability to resist the MITM data interception to trace OTP generating seed. Furthermore, it can resist the Shoulder-surfing attack as well. REAL can be used in multiple dimension form factor also. It has potential to be used in other applications with new implementations. REAL can also be further enhanced on its security strength. A comparison of the Two REAL OTP Token Implementation Methods is shown below:

| | | |
| --- | --- | --- |
| OTP Generation Algorithm | OATH TOTP | OATH HOTP |
| OTP Generation | By server | By server |
| OTP Storage and Delivery | No storage is needed. The OTP is generated on a real time basis and sent to the remote user through Internet. | Encrypted by a key derived from UC and stored inside Mobile phone |
| OTP Encryption Algorithm | REAL | REAL |
| REAL Matrix | REAL Image and Ciphertext Image | REAL Image only |
| REAL Matrix size | large | Medium or small |
| Encrypted OTP Codes | Server generates one OTP code and then encrypts it into REAL Image 1$^{st}$ and then embedded into Ciphertext Image (CI) next. CI is sent to remote user through Internet. CI is displayed on a remote PC's display. | Server generates series of OTP codes and then encrypted these codes into REAL Images. REAL Images is then converted into DATA and then bit-exclusive-OR with Offset values. Delta is generated after the logic operation. Series of the Delta values are re-scrambled to become DELTA Table (DT). DT is encrypted using a UC derived key. These encrypted DT and HI are sent to the user to be stored in a mobile phone (or PC or remote device). |
| Procedure Flow | User -> OTP Server-(OTP thru Web) -> User's PC or Internet device -> User overlay REAL H/W Token -> Read OTP code -> enter OTP for 2FA | A. OTP Server-(REAL encrypted OTP delivered to user thru Internet) -> stored in Mobile phone.<br>B. User activates OTP program at phone -> get REAL Image on phone display -> overlay H/W token -> Read OTP code -> enter OTP for 2FA. |
| Security Attack Safe | Yes (Multi-see & Multi-random OTP Tokens) | Yes (Multi-seed & Multi-random OTP Tokens) |

Generally, in operation, the computer system operable with that method shown in FIGS. 1-10 is controlled by an operating system. Typical examples of operating systems are MS-DOS, Windows95, 98, 2000, XP, Vista and Windows 7 from Microsoft Corporation, or Solaris and SunOS from Sun Microsystems, Inc., UNIX based operating systems, LINUX based operating systems, or the Apple OSX from Apple Corporation. As the computer system operates, input such as input search data, database record data, programs and commands, received from users or other processing systems, are stored on storage device. Certain commands cause the processor to retrieve and execute the stored programs. The programs executing on the processor may obtain more data from the same or a different input device, such as a network connection. The programs may also access data in a database for example, and commands and other input data may cause the processor to index, search and perform other operations on the database in relation to other input data. Data may be generated which is sent to the output device for display to the user or for transmission to another computer system or device. Typical examples of the computer system are personal computers and workstations, hand-held computers, dedicated computers designed for a specific purpose, and large main frame computers suited for use many users. The present invention is not limited to being implemented on any specific type of computer system or data processing device.

It is noted that the present invention may also be implemented in hardware or circuitry which embodies the logic and processing disclosed herein, or alternatively, the present invention may be implemented in software in the form of a computer program stored on a computer readable medium such as a storage device. In the later case, the present invention in the form of computer program logic and executable instructions is read and executed by the processor and instructs the computer system to perform the functionality disclosed as the invention herein. If the present invention is embodied as a computer program, the computer program logic is not limited to being implemented in any specific programming language. For example, commonly used programming languages such as C, C++, JAVA as well as others may be used to implement the logic and functionality of the present invention. Furthermore, the subject matter of the present invention is not limited to currently existing computer processing devices or programming languages, but rather, is meant to be able to be implemented in many different types of environments in both hardware and software.

Furthermore, combinations of embodiments of the invention may be divided into specific functions and implemented on different individual computer processing devices and systems which may be interconnected to communicate and interact with each other. Dividing up the functionality of the invention between several different computers is meant to be covered within the scope of the invention.

While this invention has been particularly shown and described with references to a preferred embodiment thereof, it will be understood by those skilled in the art that is made therein without departing from the spirit and scope of the invention as defined by the following claims.

What is claimed is:

1. A method of providing a secure access to a system comprising:
   displaying a plurality of data items as a multidimensional matrix image on a display device, wherein the multidimensional matrix image of the plurality of data items comprises a matrix image of encryption algorithm data items embedded within a matrix image of ciphertext data items, and wherein the plurality of data items include a plurality of dynamically tagged symbols and untagged symbols;
   providing a member, the member having a plurality of access points disposed on the member, wherein physical dimension of the member is smaller than the physical dimension of the multidimensional matrix image displayed on the display device, wherein the plurality of access points comprise tagged and untagged windows disposed on the member, and wherein the number of access points disposed on the member is more than the required number for displaying an access code;
   providing a plurality of first indicators on the member;
   displaying a plurality of second indicators on the display device, said plurality of second indicators associated with the plurality of data items and configured for providing indication for aligning the plurality of first indicators with the plurality of second indicators; and
   overlaying the member over the multidimensional matrix image of the plurality of data items displayed on the display device, wherein the physical dimension of the member is smaller than the physical dimension of the multidimensional matrix image displayed on the display device, and wherein the plurality of first indicators on the member are aligned with the plurality of second indicators on the display device, wherein the aligned member covers some data items and the plurality of access points do not cover other data items, wherein the plurality of access points that are uncovered reveal a code after ignoring the dynamically tagged symbols visible through the tagged windows, wherein the tagged symbols are only accepted as the code if the tagged symbols are visible through the untagged windows and wherein the untagged symbols are always accepted as the code regardless of the tagged or untagged windows which the untagged symbols are visible through, wherein the code is input to permit access to the system.

2. The method of claim 1, further comprising providing the plurality of data items comprising at least one of a number, a letter, a symbol, text, a picture and a character.

3. The method of claim 1, further comprising displaying the plurality of data items in at least one row or in a plurality of rows.

4. The method of claim 1, further comprising displaying the plurality of data items in at least one column or in a plurality of columns.

5. The method of claim 1, further comprising forming the plurality of access points as apertures or as transparent windows in the member.

6. The method of claim 1, further comprising providing the member as a hardware token.

7. The method of claim 1, further comprising providing the plurality of data items displayed on the display device as random data items, wherein the random data items have no logical association to the code, wherein if the plurality of data items are recorded by an unauthorized user, then the plurality of data items alone form no basis to obtain the code, without the member.

8. The method of claim 6, wherein the hardware token comprises a card or an access key.

9. The method of claim 1, further comprising providing a login by which a potential user may input a user credential to display the plurality of data items and a prompt for the code to be input by the user.

10. The method of claim 1, wherein the plurality of data items comprise a dimensional matrix in a spatial format with multiple dimensions, wherein each data item is equally probable, and wherein each data item has same number of occurrence in each dimension, wherein the dimensional matrix comprises a peak value of uncertainty.

11. A system for providing secure access comprising:
    a first entity having a computing device including a processor, a memory, and a network connection, the first entity providing a plurality of data items to a second entity;
    the second entity having a second computing device including a processor, a memory, an input device, and a display device for displaying the plurality of data items as a multidimensional matrix image, wherein the multidimensional matrix image of the plurality of data items comprises a matrix image of encryption algorithm data items embedded within a matrix image of ciphertext data items, and wherein the plurality of data items include a plurality of dynamically tagged symbols and untagged symbols;
    the display device displaying a prompt for a user identification and a prompt for a code;
    the second entity further having a member with a plurality of access points disposed on the member, wherein physical dimension of the member is smaller than the physical dimension of the multidimensional matrix image displayed on the display device, wherein the plurality of access points comprise tagged and untagged windows disposed on the member, and wherein the number of access points disposed on the member is more than the required number for displaying an access code;
    the member having a plurality of first indicators;
    the plurality of data items displayed on the display device having a plurality of second indicators associated with the plurality of data items, wherein the plurality of second indicators are configured for providing indication for aligning the plurality of first indicators with the plurality of second indicators;

the second entity overlaying the member over the multidimensional matrix image of the plurality of data items displayed on the display device, wherein the physical dimension of the member is smaller than the physical dimension of the multidimensional matrix image displayed on the display device, such that the plurality of first indicators on the member are aligned with the plurality of second indicators on the display device, wherein the aligned member covers some data items and the plurality of access points do not cover other data items, wherein the plurality of access points that are uncovered reveal the code after ignoring the dynamically tagged symbols visible through the tagged windows, wherein the tagged symbols are only accepted as the code if the tagged symbols are visible through the untagged windows and wherein the untagged symbols are always accepted as the code regardless of the tagged or untagged windows which the untagged symbols are visible through, and wherein the code is input by the second entity to permit access to the computing device of the first entity.

12. The system of claim 11, further comprising the first entity providing the plurality of data items comprising at least one of a number, a letter, a symbol, a text, a picture and a character.

13. The system of claim 11, further comprising displaying the plurality of data items in at least one row or in a plurality of rows.

14. The system of claim 11, further comprising displaying the plurality of data items in at least one column or in a plurality of columns.

15. The system of claim 11, further comprising forming the plurality of access points as apertures or as transparent windows in the member.

16. The system of claim 11, further comprising providing the member as a hardware token.

17. The system of claim 11, further comprising providing the plurality of data items displayed on the display device as random data items, wherein the random data items have no logical association to the code, wherein if the plurality of data items are recorded by an unauthorized user, then the plurality of data items alone form no basis to obtain the code, without the member.

18. The system of claim 16, wherein the hardware token comprises a card or an access key.

19. The system of claim 11, wherein the plurality of data items are formed in a matrix.

20. The system of claim 11, wherein the plurality of data items comprise a dimensional matrix in a spatial format with multiple dimensions, wherein each data item is equally probable, and wherein each data item has same number of occurrence in each dimension, wherein the dimensional matrix comprises a peak value of uncertainty.

21. The system of claim 11, further comprising communication links, wherein the second entity and the first entity communicate via the communication links.

22. An access token comprising:
a support comprising a covered portion and a second visible section revealing a plurality of access points, wherein the plurality of access points comprise tagged and untagged windows disposed on the support, and wherein the number of access points disposed on the support is more than the required number for capturing an access code; and
a plurality of first indicators on the support to assist with orienting the support relative to a plurality of second indicators displayed on a display device along with a multidimensional matrix image of a plurality of data items, wherein the multidimensional matrix image of the plurality of data items comprises a matrix image of encryption algorithm data items embedded within a matrix image of ciphertext data items, and wherein the plurality of data items include a plurality of dynamically tagged symbols and untagged symbols, wherein the support covers certain data items and provides a visible access code via the second visible section after ignoring the dynamically tagged symbols visible through the tagged windows when the support is oriented correctly with the multidimensional matrix image of the plurality of data items displayed on the display device, wherein the tagged symbols are only accepted as the access code if the tagged symbols are visible through the untagged windows and wherein the untagged symbols are always accepted as the access code regardless of the tagged or untagged windows which the untagged symbols are visible through, and wherein physical dimension of the support is smaller than the physical dimension of the multidimensional matrix image displayed on the display device.

* * * * *